United States Patent
Watfa et al.

(10) Patent No.: US 9,338,701 B2
(45) Date of Patent: May 10, 2016

(54) METHOD AND APPARATUS FOR EFFICIENT SIGNALING AND USAGE OF RESOURCES FOR WIRELESS COMMUNICATIONS SUPPORTING CIRCUIT SWITCHED AND PACKET SWITCHED SESSIONS

(71) Applicant: InterDigital Patent Holdings, Inc., Wilmington, DE (US)

(72) Inventors: Mahmoud Watfa, Saint Leonard (CA); Behrouz Aghili, Commack, NY (US); Ulises Olvera-Hernandez, Kirkland (CA); Nobuyuki Tamaki, Melville, NY (US); Pascal M. Adjakple, Great Neck, NY (US); J. Patrick Tooher, Montreal (CA); Peter S. Wang, E. Setauket, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/194,195

(22) Filed: Feb. 28, 2014

(65) Prior Publication Data
US 2014/0177596 A1    Jun. 26, 2014

Related U.S. Application Data

(63) Continuation of application No. 12/915,942, filed on Oct. 29, 2010, now Pat. No. 8,705,445.

(60) Provisional application No. 61/256,421, filed on Oct. 30, 2009, provisional application No. 61/265,917, (Continued)

(51) Int. Cl.
*H04W 36/00*    (2009.01)
*H04B 7/212*    (2006.01)
*H04J 3/06*    (2006.01)

(52) U.S. Cl.
CPC ...... *H04W 36/0033* (2013.01); *H04W 36/0022* (2013.01); *H04B 7/2125* (2013.01); *H04B 7/2126* (2013.01); *H04J 3/0638* (2013.01)

(58) Field of Classification Search
None
See application file for complete search history.

(56) References Cited

U.S. PATENT DOCUMENTS 5,444,764 A    8/1995    Galecki
6,373,949 B1   4/2002    Aura
(Continued)

FOREIGN PATENT DOCUMENTS

CN    101005692 A    7/2007
EP    1 947 889       7/2008
(Continued)

OTHER PUBLICATIONS

Ericsson et al., "LTE Home NB Text Proposal", 3GPP TSG RAN WG3 Meeting #55bis, R3-070714, (St. Julian's, Malta, Mar. 27-30, 2007).

(Continued)

*Primary Examiner* — Jay P Patel
(74) *Attorney, Agent, or Firm* — Condo Roccia Koptiw LLP

(57) ABSTRACT

Method and apparatus efficiently signal and use resources for wireless communications supporting circuit switched (CS) and packet switched sessions (PS). Signaling and interaction between the wireless transmit/receive unit (WTRU), and various network entities, such as the Mobility Management Entity (MME), the Visitor Location Register (VLR), and Base Stations (BS), are used to implement circuit switched fall back (CSFB) in a PS system.

12 Claims, 16 Drawing Sheets

Related U.S. Application Data filed on Dec. 2, 2009, provisional application No. 61/293,084, filed on Jan. 7, 2010, provisional application No. 61/303,761, filed on Feb. 12, 2010, provisional application No. 61/320,027, filed on Apr. 1, 2010.

(56) References Cited

U.S. PATENT DOCUMENTS

| | | | |
|---|---|---|---|
| 6,385,461 | B1 | 5/2002 | Raith |
| 6,826,414 | B1 | 11/2004 | Reynolds et al. |
| 8,369,253 | B2 * | 2/2013 | Faccin et al. ............... 370/310.2 |
| 8,374,635 | B2 | 2/2013 | Harris |
| 2006/0056396 | A1 | 3/2006 | Chao et al. |
| 2006/0264217 | A1 | 11/2006 | Shaheen |
| 2007/0097914 | A1 | 5/2007 | Grilli et al. |
| 2008/0220782 | A1 | 9/2008 | Wang et al. |
| 2008/0267153 | A1 | 10/2008 | Mukherjee et al. |
| 2009/0168727 | A1 | 7/2009 | Somasundaram et al. |
| 2009/0185524 | A1 | 7/2009 | Sammour et al. |
| 2009/0239533 | A1 | 9/2009 | Somasundaram et al. |
| 2009/0262682 | A1 | 10/2009 | Khetawat et al. |
| 2009/0265542 | A1 | 10/2009 | Khetawat et al. |
| 2009/0265543 | A1 | 10/2009 | Khetawat et al. |
| 2009/0270114 | A1 | 10/2009 | Harris |
| 2009/0275326 | A1 | 11/2009 | Lee et al. |
| 2009/0325634 | A1 | 12/2009 | Bienas et al. |
| 2010/0069119 | A1 | 3/2010 | Mueck et al. |
| 2010/0075670 | A1 | 3/2010 | Wu |
| 2010/0075698 | A1 | 3/2010 | Rune et al. |
| 2010/0110945 | A1 | 5/2010 | Koskela et al. |
| 2010/0130197 | A1 | 5/2010 | Wu |
| 2010/0165940 | A1 | 7/2010 | Watfa et al. |
| 2010/0172301 | A1 | 7/2010 | Watfa et al. |
| 2010/0234028 | A1 | 9/2010 | Narasimha et al. |
| 2010/0284333 | A1 | 11/2010 | Shirota et al. |
| 2010/0296421 | A1 | 11/2010 | Watfa et al. |
| 2010/0317378 | A1 | 12/2010 | Fang et al. |
| 2010/0323695 | A1 | 12/2010 | Kallio et al. |
| 2010/0329243 | A1 | 12/2010 | Buckley et al. |
| 2011/0002267 | A1 | 1/2011 | Dwyer et al. |
| 2011/0002268 | A1 | 1/2011 | Dwyer et al. |
| 2011/0194505 | A1 * | 8/2011 | Faccin et al. ................... 370/329 |
| 2011/0216645 | A1 | 9/2011 | Song et al. |
| 2012/0014324 | A1 | 1/2012 | Dwyer et al. |

FOREIGN PATENT DOCUMENTS

| | | |
|---|---|---|
| GB | 2 315 193 | 1/1998 |
| JP | 2006-081173 A | 3/2006 |
| JP | 2010-528497 A | 8/2010 |
| WO | 98/49856 | 11/1998 |
| WO | 00/30375 | 5/2000 |
| WO | 2005/115042 | 12/2005 |
| WO | WO 2008/115447 A2 | 9/2008 |
| WO | 2009/001269 | 12/2008 |
| WO | WO 2008/148432 A1 | 12/2008 |
| WO | 2009/020361 | 2/2009 |
| WO | 2009/043002 | 4/2009 |
| WO | 2009/044318 | 4/2009 |
| WO | WO 2009/087099 A1 | 7/2009 |
| WO | WO 2009/095777 A1 | 8/2009 |
| WO | WO 2010/037053 A1 | 4/2010 |

OTHER PUBLICATIONS

Huawei et al., "Discussion on CSFB paging procedure when UE is in connected mode," 3GPP TSG CT WG1 Meeting #57, C1-090100 (Feb. 9-19, 2009).
Huawei, "Cell re-selection for hNB," 3GPP TSG RAN2 #60, R2-074831(Nov. 5-9, 2007).
Huawei, "Discussion on the CLI for CS fallback," 3GPP TSG CT WG4 Meeting #40-bis, C4-082700 (Oct. 6-10, 2008).
Huawei, "Measurement Gap Scheduling in HO Procedure in LTE," 3GPP TSG RAN2 Meeting #52, Athens, Greece, Mar. 27-31, 2006.
Interdigital LLC, "Discussion paper on cancelling a call set-up request during the CSFB procedure," 3GPP TSG CT WG1 Meeting #60, C1-093555 (Aug. 24-28, 2009).
Motorola, "[66b#5] UMTSLTE: Inbound CSG Mobility LTE," 3GPP TSG-RAN WG2 Meeting #67, Shenzhen, China, Aug. 24-28, 2009.
Nokia Corporation et al., "CSG Cell Identification for Mobility and Measurement Reporting," 3GPP TSG-RAN WG2 Meeting #59bis, R2-073920 (Oct. 8-12, 2007).
Nokia et al., "Pseudo-CR on introduction of Extended Service Request," 3GPP TSG CT WG1 Meeting #55bis, C1-084743 (Oct. 6-10, 2008).
NTT Docomo, Inc., "Cell ID Assignment for Home Node B," 3GPP TSG RAN WG2 Meeting #59, R2-073374 (Aug. 20-24, 2007).
Qualcomm Europe, "Measurement and mobility issues for home (e)Node Bs," 3GPP TSG-RAN WG2 #59bis, R2-074117 (Oct. 2007).
Qualcomm, "[66b#4] UMTSLTE: Inbound CSG Mobility UMTS," 3GPP TSG-RAN WG2 Meeting #67, Shenzhen, China, Aug. 24-28, 2009.
Rapporteur Huawei et al., "Home NB and Home eNB Enhancements RAN2 Aspects," TSG-RAN Meeting #45, Seville, Spain, Sep. 15-18, 2009.
Samsung, "Inbound Mobility to H(e)NBs," 3GPP TSG-RAN WG2 Meeting #66, San Francisco, U.S.A., May 4-8, 2009.
Samsung, "Measurement of home & private eNBs," 3GPP TSG-RAN2 Meeting #59, R2-073307 (Aug. 2007).
Third Generation Partnership Project, "Technical Specification Group Radio Access Network; Radio Resource Control (RRC) Protocol Specification (Release 8)," 3GPP TS 25.331 v8.6.0, Mar. 2009.
Third Generation Partnership Project, "Technical Specification Group Radio Access Network; Radio Resource Control (RRC) Protocol Specification (Release 8)," 3GPP TS 25.331 v8.10.0, Apr. 2010.
Third Generation Partnership Project, "Technical Specification Group Radio Access Network; Radio Resource Control (RRC) Protocol Specification (Release 8)," 3GPP TS 25.331 v9.2.1, Apr. 2010.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.9.0, Jun. 2009.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.12.0, Apr. 2010.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300 v9.0.0, Jun. 2009.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300 v9.3.0, Apr. 2010.
Third Generation Partnership Project, "Technical Specification Group Radio Access Network; Evolved Universal Terrestrial Radio Access (E-UTRA); User Equipment (UE) Procedures in Idle Mode (Release 8)," 3GPP TS 36.304 v8.6.0, Jun. 2009.
Third Generation Partnership Project, "Technical Specification Group Radio Access Network; Evolved Universal Terrestrial Radio Access (E-UTRA); User Equipment (UE) Procedures in Idle Mode (Release 8)," 3GPP TS 36.304 v8.8.0, Jan. 2010.
Third Generation Partnership Project, "Technical Specification Group Radio Access Network; Evolved Universal Terrestrial Radio Access (E-UTRA); User Equipment (UE) Procedures in Idle Mode (Release 9)," 3GPP TS 36.304 v9.3.0, Jun. 2010.
Third Generation Partnership Project, "Technical Specification Group Radio Access Network; Evolved Universal Terrestrial Radio Access (E-UTRA); Radio Resource Control (RRC); Protocol Specification (Release 8)," 3GPP TS 36.331 v8.6.0, Jun. 2009.
Third Generation Partnership Project, "Technical Specification Group Radio Access Network; Evolved Universal Terrestrial Radio

(56) References Cited

OTHER PUBLICATIONS

Access (E-UTRA); Radio Resource Control (RRC); Protocol Specification (Release 8)," 3GPP TS 36.331 v8.9.0, Apr. 2010.
Third Generation Partnership Project, "Technical Specification Group Radio Access Network; Evolved Universal Terrestrial Radio Access (E-UTRA); Radio Resource Control (RRC); Protocol Specification (Release 9)," 3GPP TS 36.331 v9.2.0, Apr. 2010.
Third Generation Partnership Project, "Technical Specification Group Services and System Aspects; Service accessibility (Release 10)," 3GPP TS 22.011 V10.1.0 (Sep. 2010).
Third Generation Partnership Project, "Technical Specification Group Services and System Aspects; Service accessibility (Release 9)," 3GPP TS 22.011 V9.4.0 (Jun. 2010).
Third Generation Partnership Project, "Technical Specification Group Services and System Aspects; Service accessibility (Release 9)," 3GPP TS 22.011 V9.2.0 (Sep. 2009).
Third Generation Partnership Project, "Technical Specification Group Services and System Aspects; Service accessibility (Release 8)," 3GPP TS 22.011 V8.9.0 (Sep. 2009).
Third Generation Partnership Project, "Technical Specification Group Services and System Aspects; Service accessibility (Release 7)," 3GPP TS 22.011 V7.9.0 (Mar. 2008).
Third Generation Partnership Project, "Technical Specification Group Radio Access Network; Mobility Procedures for Home NodeB; Overall Description; Stage 2 (Release 9)," 3GPP TS 25.367 V9.1.0 (Sep. 2009).
Third Generation Partnership Project, "Technical Specification Group Radio Access Network; Mobility Procedures for Home Node B (HNB); Overall Description; Stage 2 (Release 9)," 3GPP TS 25.367 V9.4.0 (Jun. 2010).
Third Generation Partnership Project, "Technical Specification Group Radio Access Network; Mobility Procedures for Home NodeB; Overall Description; Stage 2 (Release 8)," 3GPP TS 25.367 V8.3.0 (Dec. 2009).
Third Generation Partnership Project, "Technical Specification Group Radio Access Network; Mobility Procedures for Home NodeB; Overall Description; Stage 2 (Release 8)," 3GPP TS 25.367 V8.2.0 (Sep. 2009).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.10.0 (Jun. 2010).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.3.0 (Jun. 2010).
Third Generation Partnership Project, "Technical Specification Group Radio Access Network; Evolved Universal Terrestrial Radio Access (E-UTRA); and Evolved Universal Terrestrial Radio Access Network (E-UTRAN); Overall description; Stage 2 (Release 10)," 3GPP TS 36.300 V10.0.0 (Jun. 2010).
Third Generation Partnership Project, "Technical Specification Group Radio Access Network; Evolved Universal Terrestrial Radio Access (E-UTRA); and Evolved Universal Terrestrial Radio Access Network (E-UTRAN); Overall description; Stage 2 (Release 9)," 3GPP TS 36.300 V9.4.0 (Jun. 2010).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.20.0 (Dec. 2008).
Third Generation Partnership Project, "Technical Specification Group Radio Access Network; Radio Resource Control (RRC); Protocol specification (Release 10)," 3GPP TS 25.331 V10.0.0 (Jun. 2010).
Third Generation Partnership Project, "Technical Specification Group Radio Access Network; Radio Resource Control (RRC); Protocol specification (Release 8)," 3GPP TS 25.331 V8.11.0 (Jun. 2010).
Third Generation Partnership Project, "Technical Specification Group Radio Access Network; Radio Resource Control (RRC); Protocol specification (Release 9)," 3GPP TS 25.331 V9.3.0 (Jun. 2010).
Third Generation Partnership Project, "Technical Specification Group Radio Access Network; Radio Resource Control (RRC); Protocol Specification (Release 5)," 3GPP TS 25.331 V5.24.0 (Jun. 2009).
Third Generation Partnership Project, "Technical Specification Group Radio Access Network; Radio Resource Control (RRC); Protocol Specification (Release 7)," 3GPP TS 25.331 V7.17.0 (Jun. 2010).
Third Generation Partnership Project, "Technical Specification Group Radio Access Network; Radio Resource Control (RRC); Protocol Specification (Release 7)," 3GPP TS 25.331 V7.12.1 (Apr. 2009).
Third Generation Partnership Project, "Technical Specification Group Radio Access Network; Radio Resource Control (RRC); Protocol Specification (Release 6)," 3GPP TS 25.331 V6.22.0 (Jun. 2009).
Third Generation Partnership Project, "Technical Specification Group Radio Access Network; Radio Resource Control (RRC); Protocol Specification (Release 5)," 3GPP TS 25.331 V5.22.0 (May 2008).
Third Generation Partnership Project, "Technical Specification Group Radio Access Network; Radio Resource Control (RRC); Protocol Specification (Release 6)," 3GPP TS 25.331 V6.25.0 (Mar. 2010).
Third Generation Partnership Project, "Technical Specification Group Radio Access Network; Requirements for support of radio resource management (FDD) (Release 9)," 3GPP TS 25.133 V9.3.0 (Mar. 2010).
Third Generation Partnership Project, "Technical Specification Group Radio Access Network; Requirements for support of radio resource management (FDD) (Release 9)," 3GPP TS 25.133 V9.0.0 (May 2009).
Third Generation Partnership Project, "Technical Specification Group Radio Access Network; Requirements for support of radio resource management (FDD) (Release 8)," 3GPP TS 25.133 V8.10.0 (Mar. 2010).
Third Generation Partnership Project, "Technical Specification Group Radio Access Network; User Equipment (UE) procedures in idle mode and procedures for cell reselection in connected mode (Release 4)," 3GPP TS 25.304 V4.8.0 (Mar. 2004).
Third Generation Partnership Project, "Technical Specification Group Radio Access Network; User Equipment (UE) procedures in idle mode and procedures for cell reselection in connected mode (Release 7)," 3GPP TS 25.304 V7.7.0 (Sep. 2008).
Third Generation Partnership Project, "Technical Specification Group Radio Access Network; User Equipment (UE) procedures in idle mode and procedures for cell reselection in connected mode (Release 6)," 3GPP TS 25.304 V6.10.0 (Mar. 2008).
Third Generation Partnership Project, "Technical Specification Group Radio Access Network; User Equipment (UE) procedures in idle mode and procedures for cell reselection in connected mode (Release 8)," 3GPP TS 25.304 V8.6.0 (Jun. 2009).
Third Generation Partnership Project, "Technical Specification Group Radio Access Network; Requirements for support of radio resource management (FDD) (Release 6)," 3GPP TS 25.133 V6.24.0 (Mar. 2009).
Third Generation Partnership Project, "Technical Specification Group Radio Access Network; User Equipment (UE) procedures in idle mode and procedures for cell reselection in connected mode (Release 7)," 3GPP TS 25.304 V7.8.0 (Sep. 2009).
Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).

(56) References Cited

OTHER PUBLICATIONS

Third Generation Partnership Project, "Technical Specification Group Radio Access Network; Requirements for support of radio resource management (FDD) (Release 7)," 3GPP TS 25.133 V7.14.0 (Mar. 2009).
Third Generation Partnership Project, "Technical Specification Group Radio Access Network; Requirements for support of radio resource management (FDD) (Release 1999)," 3GPP TS 25.133 V3.22.0 (Sep. 2005).
Third Generation Partnership Project, "Technical Specification Group Radio Access Network; Requirements for support of radio resource management (FDD) (Release 4)," 3GPP TS 25.133 V4.17.0 (Mar. 2006).
Third Generation Partnership Project, "Technical Specification Group Radio Access Network; Requirements for support of radio resource management (FDD) (Release 8)," 3GPP TS 25.133 V8.7.0 (May 2009).
Third Generation Partnership Project, "Technical Specification Group Radio Access Network; User Equipment (UE) procedures in idle mode and procedures for cell reselection in connected mode (Release 9)," 3GPP TS 25.304 V9.2.0 (Jun. 2010).
Third Generation Partnership Project, "Technical Specification Group Radio Access Network; Requirements for support of radio resource management (FDD) (Release 7)," 3GPP TS 25.133 V7.15.0 (Sep. 2009).
Third Generation Partnership Project, "Technical Specification Group Radio Access Network; Mobility Procedures for Home NodeB; Overall Description; Stage 2 (Release 9)," 3GPP TS 25.367 V9.0.0 (Jun. 2009).
Third Generation Partnership Project, "Technical Specification Group Radio Access Network; User Equipment (UE) procedures in idle mode and procedures for cell reselection in connected mode(Release 1999)," 3GPP TS 25.304 V3.14.0 (Mar. 2004).
Third Generation Partnership Project, "Technical Specification Group Radio Access Network; Mobility Procedures for Home NodeB; Overall Description; Stage 2 (Release 8)," 3GPP TS 25.367 V8.1.0 (Mar. 2009).
Third Generation Partnership Project, "Technical Specification Group Radio Access Network; Requirements for support of radio resource management (FDD) (Release 5)," 3GPP TS 25.133 V5.18.0 (Sep. 2007).
Third Generation Partnership Project, "Technical Specification Group Radio Access Network; User Equipment (UE) procedures in idle mode and procedures for cell reselection in connected mode (Release 8)," 3GPP TS 25.304 V8.10.0 (Jun. 2010).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.3.0 (Sep. 2009).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.7.0 (Sep. 2010).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.0.0 (Sep. 2009).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.4.0 (Sep. 2010).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.0.0 (Sep. 2010).
Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.5.0 Release 8), ETSI TS 136 300 V8.5.0 (Jul. 2008).
Vodafone Group, "Tracking Areas Concepts", 3GPP TSG RAN WG3 #55, R3-070112, (St. Louis, USA, Feb. 16, 2007.
3rd Generation Partnership Project (3GPP), C1-083292, "Update the Description of Paging for Non-EPS Services Procedure", Huawei, 3GPP TSG CT WG1 Meeting #55, Aug. 18-22, 2008, 3 pages.
3rd Generation Partnership Project (3GPP), TS 23.272 V8.5.0, Technical Specification Group Services and System Aspects, Circuit Switched Fallback in Evolved Packet System, Stage 2 (Release 8), Sep. 2009, pp. 1-53.
3rd Generation Partnership Project (3GPP), TS 23.272 V8.9.0, "Technical Specification Group Services and System Aspects, Circuit Switched (CS) Fallback in Evolved Packet System (EPS), Stage 2 (Release 8)", Sep. 2010, pp. 1-56.
3rd Generation Partnership Project (3GPP), TS 23.272 V9.1.0, "Technical Specification Group Services and System Aspects, Circuit Switched Fallback in Evolved Packet System, Stage 2 (Release 9)", Sep. 2009, pp. 1-60.
3rd Generation Partnership Project (3GPP), TS 24.008 V10.0.0, "Technical Specification Group Core Network and Terminals, Mobile Radio Interface Layer 3 Specification, Core Network Protocols, Stage 3 (Release 10)", Sep. 2010, pp. 1-616.
3rd Generation Partnership Project (3GPP), TS 24.008 V7.14.0, "Technical Specification Group Core Network and Terminals, Mobile Radio Interface Layer 3 Specification, Core Network Protocols, Stage 3 (Release 7)", Mar. 2009, pp. 1-550.
3rd Generation Partnership Project (3GPP), TS 24.008 V7.15.0, "Technical Specification Group Core Network and Terminals, Mobile Radio Interface Layer 3 Specification, Core Network Protocols; Stage 3 (Release 7)", Mar. 2010, pp. 1-550.
3rd Generation Partnership Project (3GPP), TS 24.008 V8.11.0, "Technical Specification Group Core Network and Terminals, Mobile Radio Interface Layer 3 Specification, Core Network Protocols, Stage 3 (Release 8)", Sep. 2010, pp. 1-593.
3rd Generation Partnership Project (3GPP), TS 24.008 V8.7.0, "Technical Specification Group Core Network and Terminals, Mobile Radio Interface Layer 3 Specification, Core Network Protocols, Stage 3 (Release 8)", Sep. 2009, pp. 1-587.
3rd Generation Partnership Project (3GPP), TS 24.008 V9.0.0, "Technical Specification Group Core Network and Terminals, Mobile Radio Interface Layer 3 Specification, Core Network Protocols, Stage 3 (Release 9)", Sep. 2009, pp. 1-591.
3rd Generation Partnership Project (3GPP), TS 24.008 V9.4.0, "Technical Specification Group Core Network and Terminals, Mobile Radio Interface Layer 3 Specification, Core Network Protocols, Stage 3 (Release 9)", Sep. 2010, pp. 1-611.
3rd Generation Partnership Project (3GPP), TS 24.011 V8.2.0, "Technical Specification Group Core Network and Terminals, Point-to-Point (PP) Short Message Service (SMS) Support on Mobile Radio Interface (Release 8)" Jun. 2009, pp. 1-108.
3rd Generation Partnership Project (3GPP), TS 24.011 V9.0.1, "Technical Specification Group Core Network and Terminals, Point-to-Point (PP) Short Message Service (SMS) Support on Mobile Radio Interface (Release 9)", Feb. 2010, pp. 1-108.
3rd Generation Partnership Project (3GPP), TS 29.118 V10.1.0, "Technical Specification Group Core Network and Terminals, Mobility Management Entity (MME)-Visitor Location Register (VLR) SGs Interface Specification (Release 10)", Sep. 2010, pp. 1-58.
3rd Generation Partnership Project (3GPP), TS 29.118 V8.3.0, "Technical Specification Group Core Network and Terminals, Mobility Management Entity (MME)-Visitor Location Register (VLR) SGs Interface Specification (Release 8)", Sep. 2009, pp. 1-53.
3rd Generation Partnership Project (3GPP), TS 29.118 V8.7.0, "Technical Specification Group Core Network and Terminals, Mobility Management Entity (MME)-Visitor Location Register (VLR) SGs Interface Specification (Release 8)", Sep. 2010, pp. 1-55.
3rd Generation Partnership Project (3GPP), TS 29.118 V9.3.0, "Technical Specification Group Core Network and Terminals, Mobility Management Entity (MME)-Visitor Location Register (VLR) SGs Interface Specification (Release 9)", Sep. 2010, pp. 1-56.
3rd Generation Partnership Project (3GPP), TS 36.413 V8.10.0, "Technical Specification Group Radio Access Network, Evolved

(56) References Cited

OTHER PUBLICATIONS

Universal Terrestrial Radio Access Network (E-UTRAN), 51 Application Protocol (S1AP) (Release 8)", Jun. 2010, pp. 1-217.
3rd Generation Partnership Project (3GPP), TS 36.413 V8.7.0, "Technical Specification Group Radio Access Network, Evolved Universal Terrestrial Radio Access Network (E-UTRAN), S1 Application Protocol (S1AP) (Release 8)", Sep. 2009, pp. 1-219.
3rd Generation Partnership Project (3GPP), Ts 36.413 V9.0.0, "Technical Specification Group Radio Access Network, Evolved Universal Terrestrial Radio Access Network (E-UTRAN), S1 Application Protocol (S1AP) (Release 9)", Sep. 2009, pp. 1-227.
3rd Generation Partnership Project (3GPP), TS 36.413 V9.4.0, "Technical Specification Group Radio Access Network, Evolved Universal Terrestrial Radio Access Network (E-UTRAN), S1 Application Protocol (S1AP) (Release 9)", Sep. 2010, pp. 1-241.
3rd Generation Partnership Project(3GPP), TS 23.272 V10.1.0, "Technical Specification Group Services and System Aspects, Circuit Switched (CS) Fallback in Evolved Packet System (EPS), Stage 2(Release 10)", Sep. 2010, pp. 1-78.
3rd Generation Partnership Project(3GPP), TS 23.272 V9.5.0, "Technical Specification Group Services and System Aspects, Circuit Switched (CS) Fallback in Evolved Packet System (EPS), Stage 2 (Release 9)", Sep. 2010, pp. 1-72.
3rd Generation Partnership Project, TS 23.401 V8.7.0, "Technical Specification Group Services and System Aspects; General Packet Radio Service (GPRS) Enhancements for Evolved Universal Terrestrial Radio Access Network (E-UTRAN) Access (Release 8)", Sep. 2009, pp. 1-13.
$3^{rd}$ Generation Partnership Project, TS 24.008 V8.3.0, "3rd Generation Partnership Project; Technical Specification Group Core Network and Terminals; Mobile radio interface Layer 3 specification; Core network protocols; Stage 3 (Release 8)", Sep. 2008, pp. 1-556.
$3^{rd}$ Generation Partnership Project, TS 36.413 V9.1.0, "3rd Generation Partnership Project; Technical Specification Group Radio Access Network; Evolved Universal Terrestrial Radio Access Network (E-UTRAN); S1 Application Protocol (S1AP) (Release 9)", Dec. 2012, pp. 1-236.

* cited by examiner

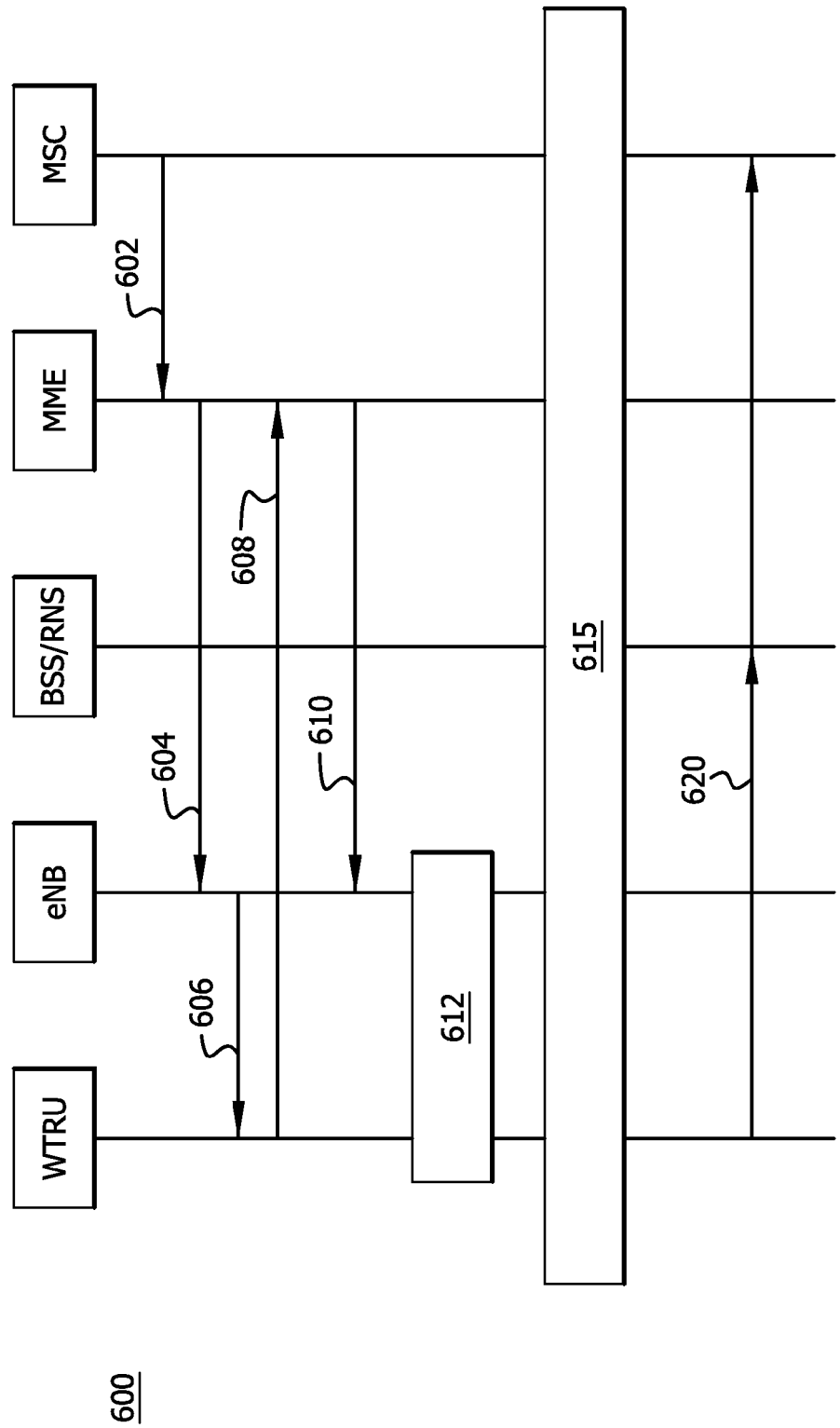

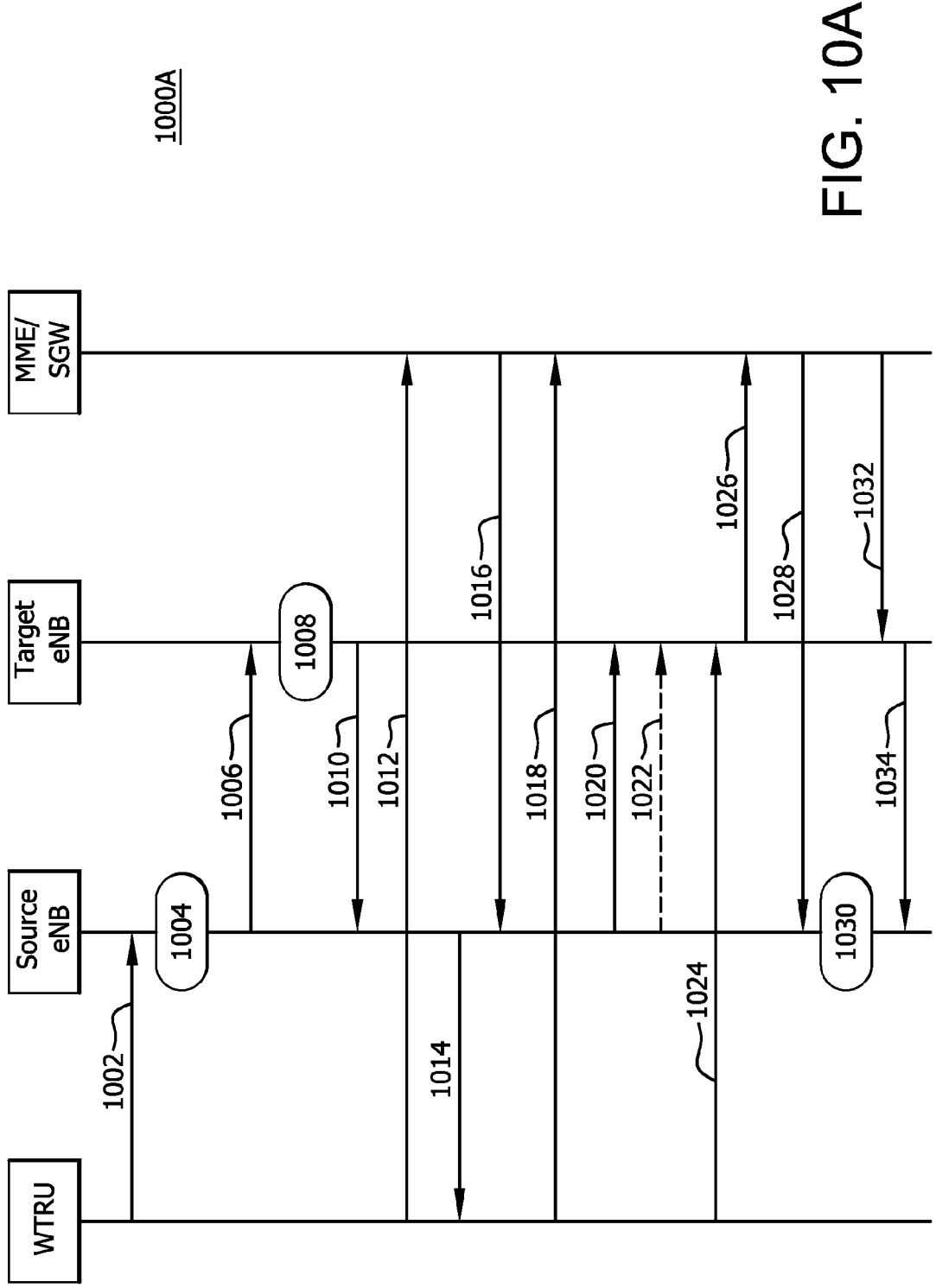

US 9,338,701 B2

METHOD AND APPARATUS FOR EFFICIENT SIGNALING AND USAGE OF RESOURCES FOR WIRELESS COMMUNICATIONS SUPPORTING CIRCUIT SWITCHED AND PACKET SWITCHED SESSIONS

CROSS REFERENCE TO RELATED APPLICATIONS

This application is a continuation of U.S. patent application Ser. No. 12/915,942 filed on Oct. 29, 2010 which claims the benefit of Provisional Application Nos. 61/320,027, filed Apr. 1, 2010; 61/303,761, filed Feb. 12, 2010; 61/293,084, filed Jan. 7, 2010; 61/265,917, filed Dec. 2, 2009; and 61/256,421, filed Oct. 30, 2009, the contents of which are hereby incorporated by reference herein.

BACKGROUND

It has been a goal in wireless communications to devise a mechanism to enable a wireless transmit/receive unit (WTRU) to place or receive a communication during an ongoing session without service interruption. For example, in a Third Generation Partnership Project (3GPP) Long Term Evolution (LTE) scenario, a goal has been to devise a mechanism to enable a WTRU, while it is connected to a packet switched (PS) domain of an Evolved Universal Terrestrial Radio Access Network (E-UTRAN), to place (i.e., originating) or receive (i.e., terminating) circuit switched (CS) services or vice versa. Examples of CS services may include at least such services as a CS voice call, a short message service (SMS), location services, or supplementary services. The initiation of a CS session during an ongoing PS session by a WTRU is referred to as CS fallback (CSFB).

SUMMARY

Method and apparatus for efficient signaling and usage of resources for wireless communications supporting circuit switched (CS) and packet switched (PS) sessions are disclosed. The behaviors of various wireless network entities, including a Mobility Management Entity (MME), a Visitor Location Register (VLR), and Base Stations (BSs), and the wireless transmit/receive units (WTRUs) that communicate with the network, are defined in order to deal with issues that arise by implementing circuit switched fall back (CSFB) in a Packet Switched (PS) system.

A VLR may decide to abort a CSFB procedure for a mobile terminating (MT) CSFB call to a wireless transmit/receive unit (WTRU), and send an abort message to an MME, in order to avoid an inter-system change for a WTRU. The MME may send a Service Reject message to the WTRU indicating that the CS call is aborted, and ignore incoming messages pertaining to the cancelled call. Bearer contexts may be synchronized between a transmitter entity and a receiver entity by including bearer context status information in any Non-Access Stratum (NAS) message transmitted to the receiver entity.

BRIEF DESCRIPTION OF THE DRAWINGS

A more detailed understanding may be had from the following description, given by way of example in conjunction with the accompanying drawings wherein:

FIG. 6 is a flow diagram of a procedure when the WTRU performs an inter-system change when a location area has changed;

FIGS. 10A and 10B are flow diagrams of examples of two possible scenarios where race conditions may occur between CSFB and intra-LTE Handover.

DETAILED DESCRIPTION

The teachings described herein may be applicable to any access technology that may support circuit switched (CS) or packet switched (PS) sessions. Examples include, but are not limited to, Long Term Evolution (LTE), Wideband Code Division Multiple Access (WCDMA), Global System for Mobile communications (GSM), General Packet Radio Service (GPRS), Enhanced Data rates for Global Evolution (EDGE), Code Division Multiple Access (CDMA2000), IEEE 802 technologies such as 802.11, 802.16 and Worldwide Interoperability for Microwave Access (WiMAX), Universal Mobile Telecommunications System (UMTS), or any future technology. For purposes of explanation, the various embodiments are described in an LTE context, but the various embodiments may be implemented using any technology that may support CS and/or PS sessions.

Figure 1A:
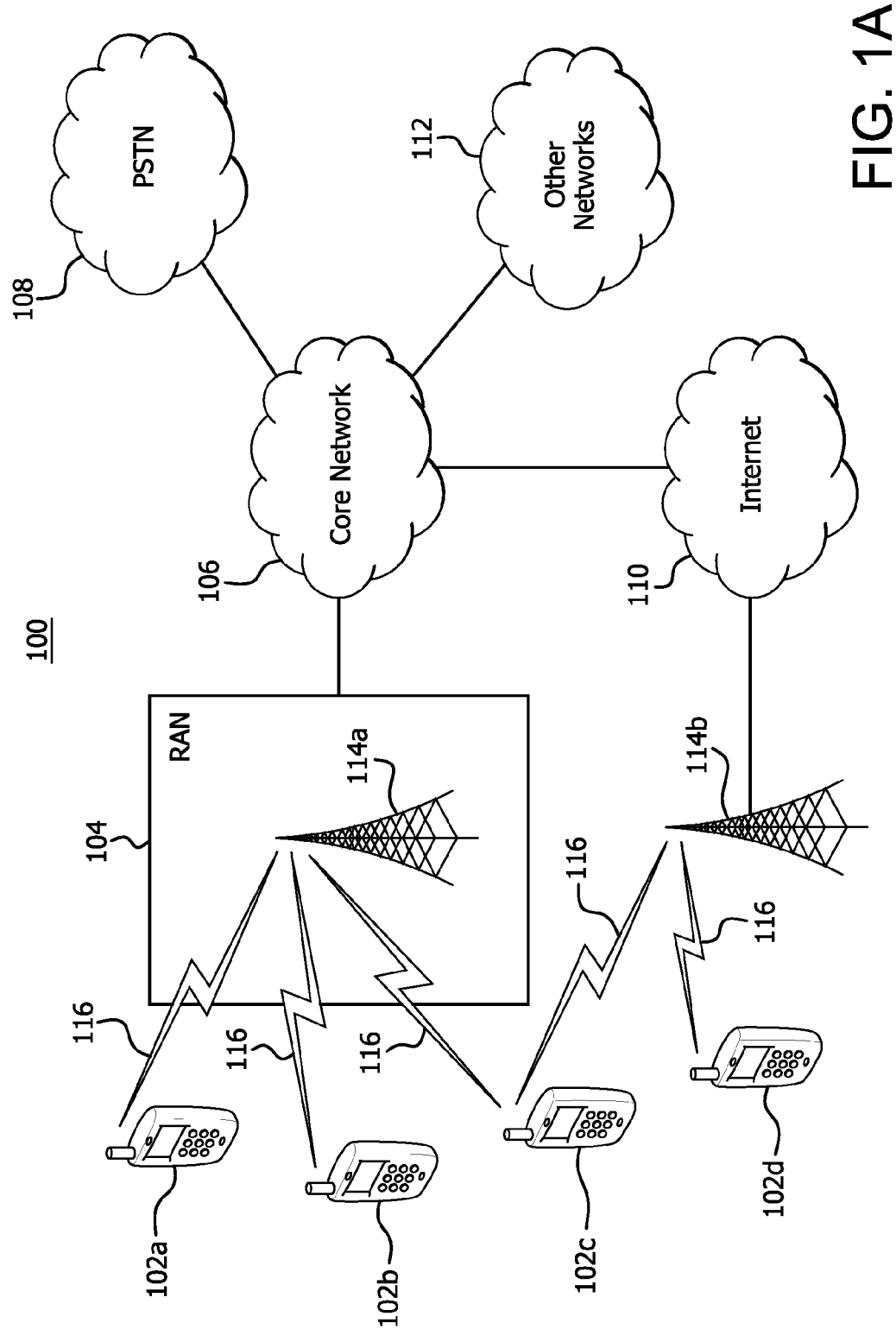
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
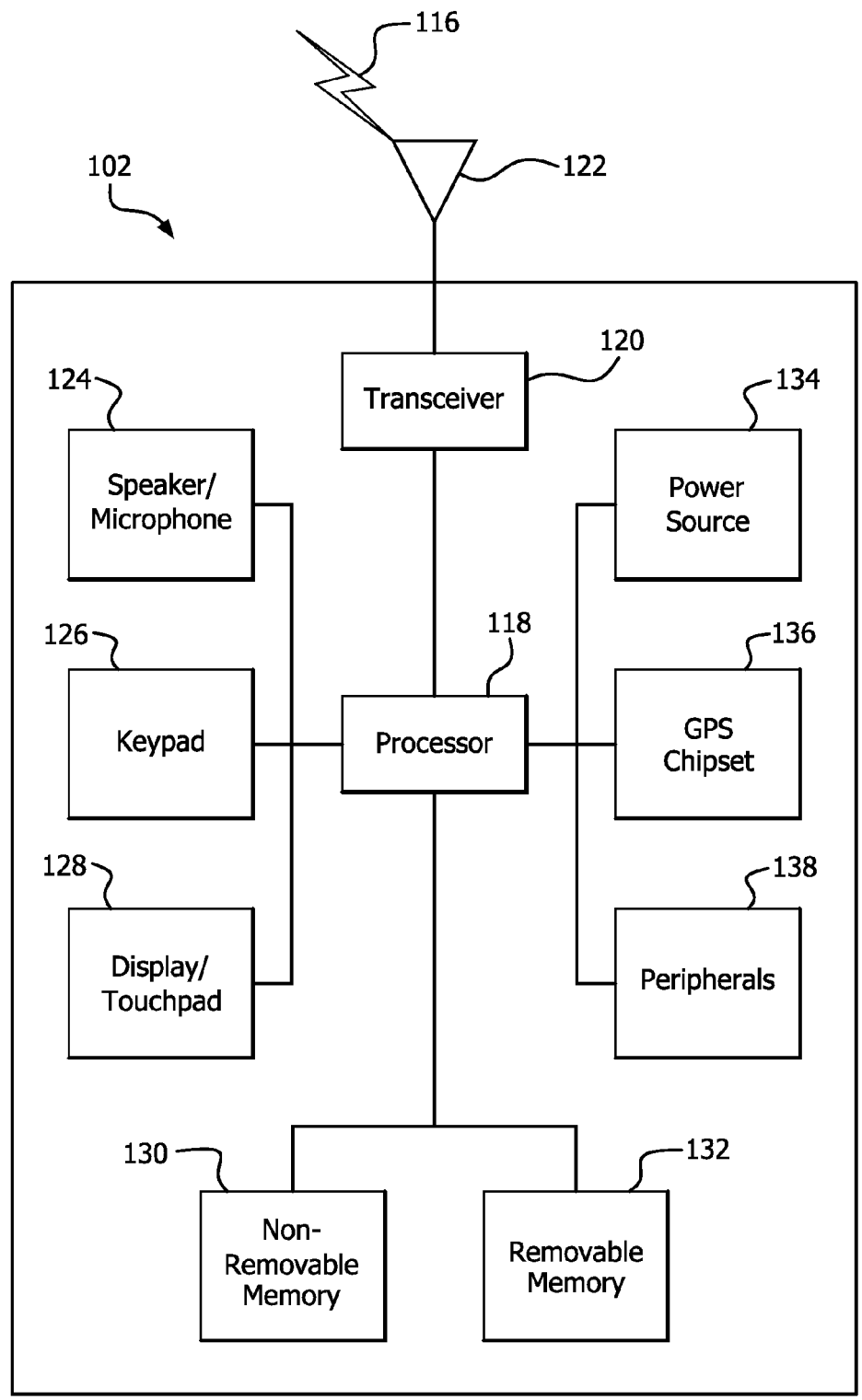
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
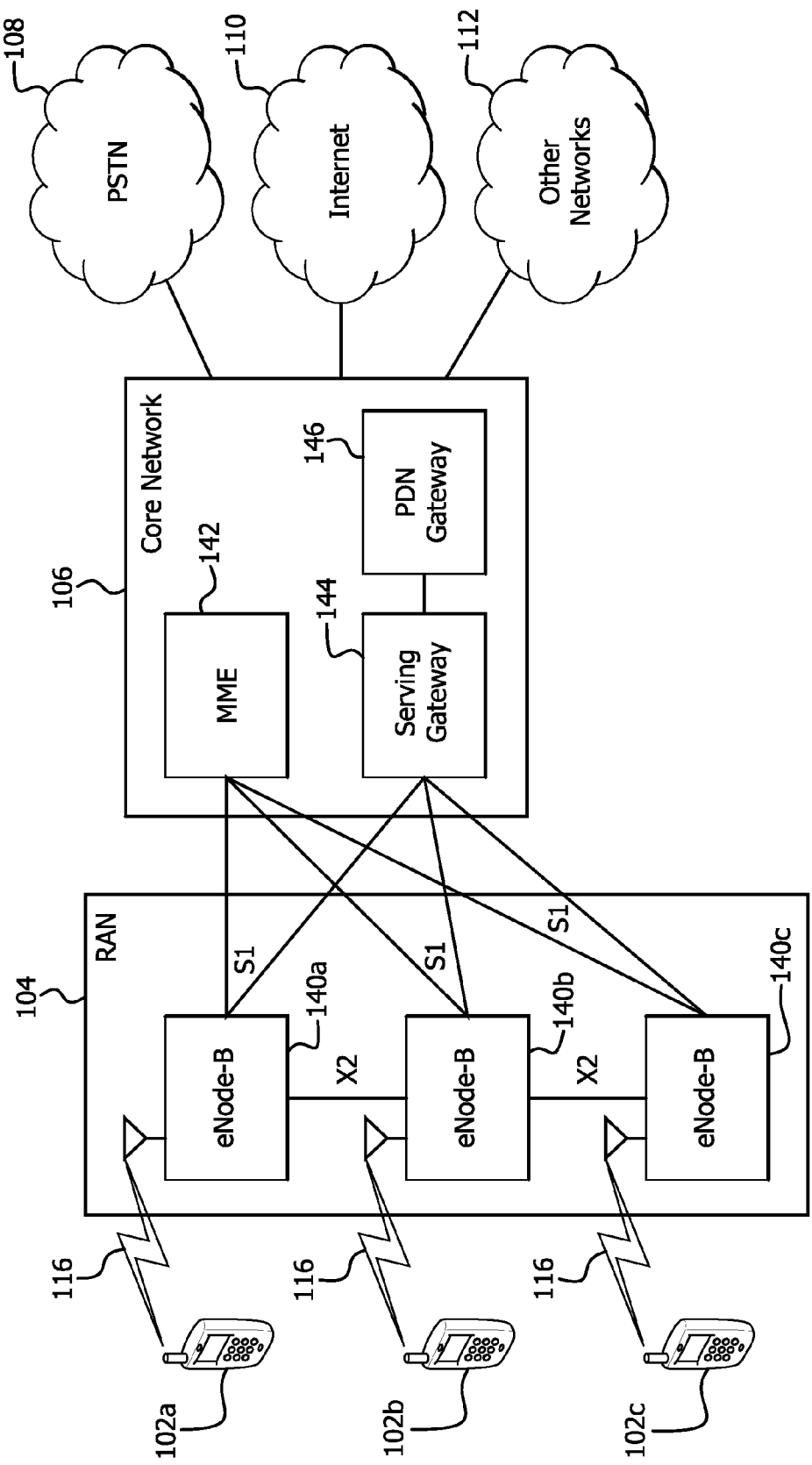
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146.

While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A problem that may occur in wireless communications systems supporting CS and PS sessions, is that a Service Request (SR) procedure may establish radio bearers when there is no pending user data, thus unnecessarily wasting radio resources. In the context of LTE systems, the Evolved Packet System (EPS) is a combination of the Evolved-UTRAN (E-UTRAN) access network and the Evolved Packet Core (EPC) network. For example, referring to FIG. 1C, the EPS is a combination of RAN 104 and Core Network 106.

The EPS may be an all IP type of network. The higher layer signaling between the WTRU and Core Network entity (i.e. the MME 142 in FIG. 1C) may be recognized as the Non Access Stratum (NAS) layer. At the NAS layer, the EPS may introduce two new protocol entities; the EPS Mobility Management (EMM) as well as the EPS Session Management (ESM). The signaling connection between the WTRU and the MME is referred to as an EMM connection. The WTRU is in EMM-IDLE Mode if it is registered with the network, but there is no EMM connection. Similarly, the WTRU is in EMM-Connected Mode when the (NAS) EMM connection exists. An EPS Bearer Context is a collection of parameters and network resources that are allocated by the network upon a WTRU's request for various services requiring different quality of service (QoS).

One purpose of the service request (SR) procedure is to transfer the EMM from EMM-IDLE to EMM-CONNECTED and establish the radio and S1 bearers when uplink user data or signaling is to be sent. Another purpose of this procedure is to invoke mobile originated (MO)/mobile terminated (MT) circuit switched (CS) fallback (CSFB) procedures. A SR procedure, regardless of its trigger (e.g., short message service (SMS) or user data), may cause the establishment of radio and S1 bearers for all active EPS bearer contexts in a wireless transmit/receive unit (WTRU). Thus, even if some triggering mechanism needs the signaling radio bearers, the mobile management entity (MME) may still establish the radio and S1 bearers for all active EPS bearer contexts if the WTRU sends an SR which is accepted by the MME.

Another way for the WTRU to request the establishment of radio and S1 bearers is by setting a one-bit position (called the "Active Flag" bit) in the Tracking Area Update (TAU) request that is sent to the MME. This may happen if user data is pending when the TAU procedure is triggered. Setting this bit informs the MME that the non-access stratum (NAS) signaling connection may be maintained and the radio and S1 bearers may be setup for all active EPS contexts.

When a WTRU sends a SR message, it starts timer T3417. This timer is then stopped normally (i.e., the procedure completed normally) if the access stratum (AS) indicates the establishment of bearers for the user plane. However, a WTRU may need to establish a NAS connection for sending/receiving SMS, sending or receiving location service information, or other information. This is carried over signalling radio bearers and there may be no need to establish radio and S1 bearers for all EPS bearer contexts when the WTRU sent the SR for SMS or other non-user plane related services. In this case, resources may be wasted and may be difficult to avoid.

According to a first embodiment, when a WTRU transitions from evolved packet system (EPS) connection management mode (EMM)-Idle mode to EMM-Connected mode, radio resources may be setup when the reason service is requested is for user data. This embodiment is described in further detail below.

When the WTRU transitions from EMM-Idle mode to EMM-Connected mode, the radio and S1 bearers may be setup if the reason that service is requested is related to user data, and may not be setup otherwise. Thus, if the WTRU is in Idle mode and is requesting non-EPS services (e.g., SMS or supplementary services (SS)), location service, or positioning services, the service request procedure does not cause the establishment of radio and S1 bearers related to the active EPS bearers. One way to achieve this is to use a different establishment cause for the case when user data is pending or when the reason for the SR is not related to pending user data, such as SMS, SS, location services, or other user data.

Additionally, the WTRU may initiate the SR procedure in EMM-Connected mode, to indicate the need for radio and S1 bearers for all active EPS bearer contexts. The WTRU may send an SR message or an Extended SR (ESR) message indicating a new type, for example "user data pending." The network then may initiate the setup of radio and S1 bearers for all active EPS bearer contexts. Because the SR message may not have a service type information element (IE), a new IE may be included in the SR (or ESR) message to indicate the pending user data status which may then trigger the establishment of radio and S1 bearers for the WTRU's contexts. The IE may be a conditional or optional IE since the current SR is four octets long. Thus, if the SR message is to be used as indicated above, this new IE may be included. Otherwise, the SR may not include this IE, (e.g., if it was sent to transition from Idle to Connected mode). This embodiment also applies to the ESR message.

Alternatively, the WTRU may send a new NAS message in Connected mode to indicate that the network must setup the radio and S1 bearers for all active EPS bearer contexts.

For any of the above options (SR, ESR, or new NAS message), the WTRU may either specify the EPS bearer context for which it needs radio and S1 bearers be set up, or the network may establish radio and S1 bearers for all active EPS bearer contexts. The former may re-use the EPS bearer context status IE (or a new IE) to indicate what EPS bearer contexts are concerned by the procedure.

Another problem that may occur in wireless communications systems supporting CS and PS sessions, is that there may be a lack of means for informing a WTRU to maintain a NAS signaling connection during a Tracking Area Update (TAU) procedure.

When a WTRU is powered on, it may register in the EPS domain by performing an "Attach" procedure. After the WTRU has attached to the EPS, it may have to inform the MME about its position using a TAU procedure. A WTRU performing a TAU procedure may indicate to the network that there is more signaling to be done and/or there is user data pending by setting a bit, called the "Active Flag" bit, in the TAU Request message. If the bit is set by the WTRU, the network may then establish radio and S1 bearers for all active EPS bearer contexts. But there is no current mechanism for the network to indicate to the WTRU that there is more mobile terminating (MT) signaling to be done even if the bit is not set in the TAU Request. Thus, it is possible that the MME receives SMS or other signaling that it needs to send to the WTRU without being able to do so.

Figure 2:
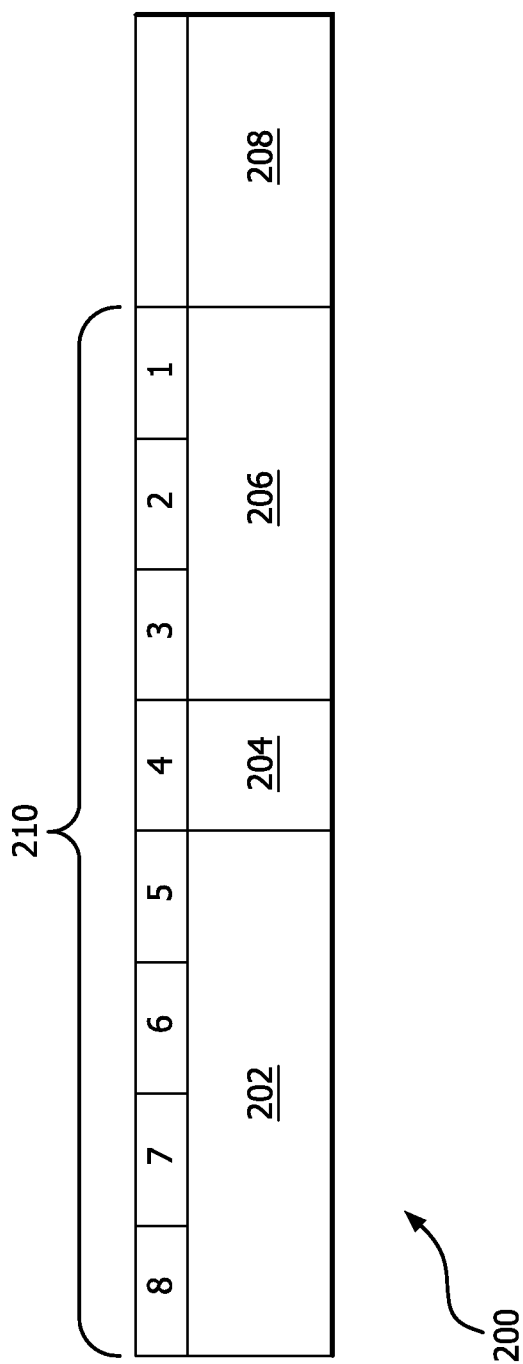
FIG. 2 is a block diagram of a tracking area update (TAU) response message including an Evolved Packet System (EPS) Update result Information Element (IE)

In one embodiment, the network indicates to a WTRU to maintain NAS signaling during tracking area update (TAU) Accept signaling. A TAU response may be sent to the WTRU from the network with the update result. FIG. 2 is a block diagram of a tracking area update (TAU) response message 200 including an Evolved Packet System (EPS) Update result Information Element (IE) 210. TAU response message 200 includes a first octet 208 and a second octet 210, where the second octet 210 is the EPS Update result IE 210. The EPS Update result IE 210 includes an IE identifier 202, a spare bit 204, and an EPS update result value 206. The EPS Update result value 206 may inform the WTRU whether its updating attempt has been successful for Tracking Area only or for both Tracking Area and Location Area. The fields of message 200 are shown with bit position labels, for example the spare bit 204 is in bit position 4, however any arrangement of the fields may be used.

The spare bit 204 may be set to "zero". The network may indicate to the WTRU that the NAS connection may be maintained for more pending signaling. For example, when a TAU request is sent to the MME, an MT SMS may also arrive at the MME. Thus, to keep the NAS signaling connection for the SMS transfer, the MME sends a TAU Accept and sets the spare bit 204 to value "one". Upon reception, the WTRU maintains its NAS signaling and RRC connection with the MME and eNB, respectively, for a configured time during which the network may continue with more signaling. The WTRU may release the connection if the time elapses without receiving signaling from the network. The network may use the maintained NAS signaling connection to send SMS, SS, location, or positioning services, or to trigger ESM procedures, (for example, activation of a dedicated bearer context which may be followed by an RRC message to establish radio and S1 bearers for all active EPS bearer contexts). The MME may also use the maintained signaling to inform the WTRU about a MT CSFB request.

Alternatively, the WTRU may expect some MT signaling before receiving the RRC Connection Release message from the eNB. If this is the case, then the WTRU may process the signaling accordingly and may not consider this as an error case.

Another problem that may occur in wireless communications systems supporting CS and PS sessions, is that EPS bearer context synchronization may be limited within the TAU procedure. An EPS Bearer Context is a collection of parameters and network resources that are allocated by the network upon a WTRU's request for various services requiring different qualities of service. Every EPS bearer context that is active in one entity (WTRU or MME/network) may have an active counterpart in the other entity (MME/network or WTRU). Thus, the WTRU and the network try to maintain their EPS bearer contexts as synchronized as possible. In some cases, in the MME, for example, an EPS bearer context may be locally deactivated because it has not been in use for some time. The MME may update the WTRU with the latest EPS bearer context status by including an information element (IE) called the EPS bearer context status IE in certain signaling messages, such as the TAU Accept message.

Upon receipt of this IE by the WTRU, it may deactivate all those EPS bearer contexts locally (without peer-to-peer signaling between the WTRU and the MME) which are active in the WTRU, but are indicated by the MME as being inactive. The same applies to the case if the WTRU has included the IE in certain messages such as TAU Request. If so, then the MME may deactivate all those EPS bearer contexts locally (without peer-to-peer signaling between the MME and the WTRU) which are active on the network side, but are indicated by the WTRU as being inactive.

The WTRU may perform a periodic TAU when its periodic timer expires. If the WTRU has deactivated a context before the next TAU takes place, then it may have to wait for the TAU initiation before synchronization with the MME/network. It may also be possible that other requests arrive before the initiation of the periodic TAU; (e.g., CSFB for which it is important to take the latest EPS bearer context status into use as the procedure leads to the reservation of corresponding resources in the target RAT). Thus, the synchronization process is not efficient because it is currently limited to TAU signaling.

In one embodiment, the EPS bearer context status IE may be included in any NAS messages. For example, the EPS bearer context status IE may be included in any or all NAS messages, (except where it may not be possible, for example in a Service Request message), even if the procedure is not the TAU procedure. Thus, every time there is an update of the context's status, the WTRU/MME/network may include the bearer context status IE in the next NAS message that is sent to the receiver, in order to promptly provide the latest context status.

According to an embodiment, the WTRU may include the IE in the Extended Service Request (ESR) message. If the WTRU is in Connected mode when it sends the ESR message and it includes the EPS bearer context status IE, then the MME when executing the handover to a CS RAT may take the included status of the context into account when, for example, performing packet switched (PS) handover (HO) or establishing resources in the target RAT.

The MME/network may include the EPS bearer context status IE in all messages, even the reject messages. For example, a Service Reject may have the EPS bearer context status IE included and the WTRU may update its contexts accordingly when it receives this IE in such a message. This applies to both the connected mode and/or the Idle mode, and to the WTRU or the network.

Upon the receipt of the bearer context status IE, the receiver entity (WTRU or MME/network) deactivates all the EPS bearer contexts locally (without peer-to-peer signaling between the WTRU and the MME) which are active in the receiver entity, but are indicated by the transmitter entity as being inactive.

Figure 3:
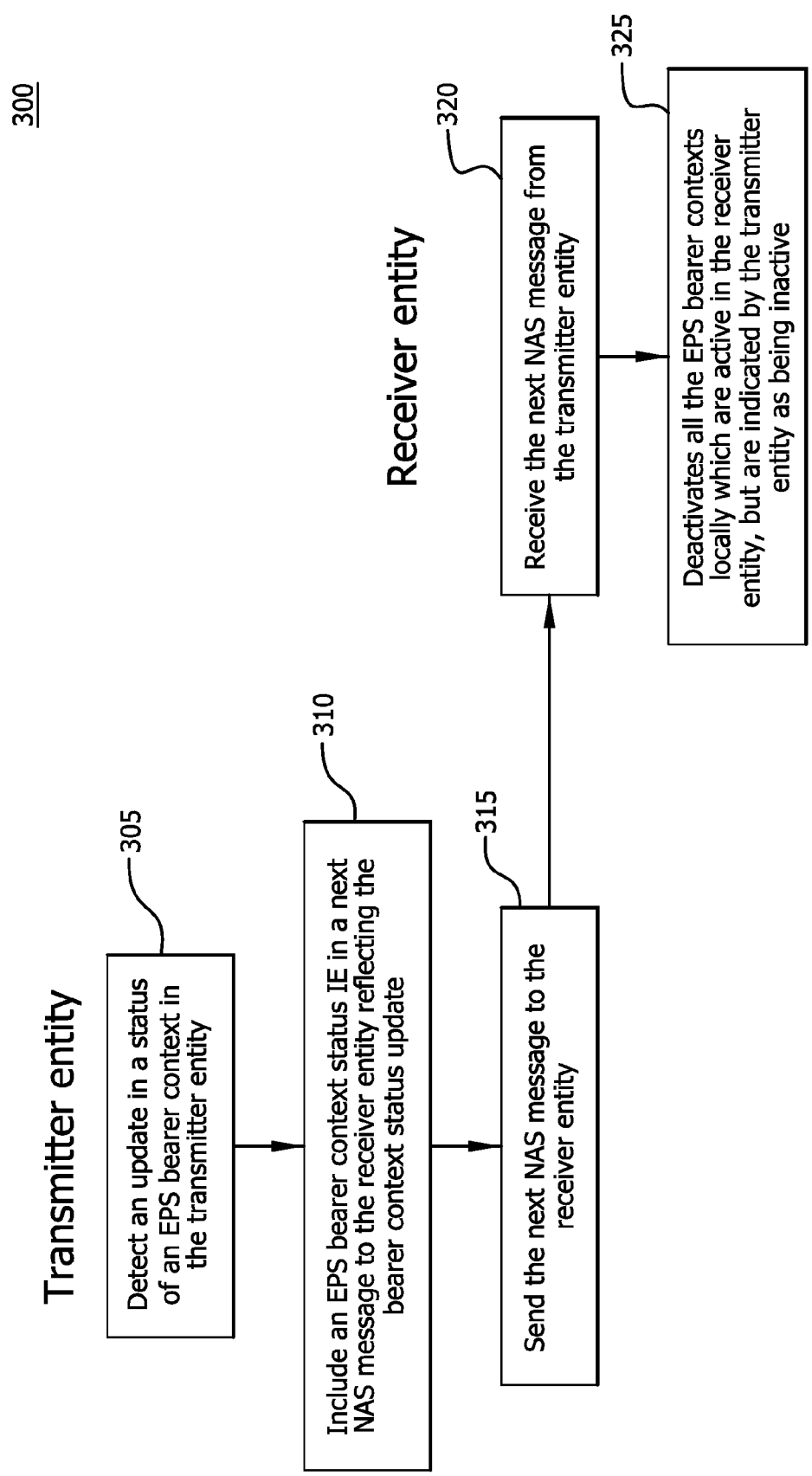
FIG. 3 is a flow diagram of a method for including the EPS bearer context status in any NAS message.

FIG. 3 is a flow diagram 300 of a method for including the EPS bearer context status in any NAS message. Steps 305-315 occur in a transmitter entity, and steps 320-325 occur in a receiver entity, where the transmitter entity and receiver entity may be on the WTRU side and the network side, respectively, or vice versa. In step 305, the transmitter entity detects an update in a status of an EPS bearer context in the transmitter entity. In step 310, the transmitter entity includes an EPS bearer context status information element (IE) in a next Non-Access Stratum (NAS) message to the receiver entity reflecting the bearer context status update. The next NAS message may be, for example, an ESR message. In step 315, the transmitter entity sends the next NAS message to the receiver entity. In step 320, the receiver entity receives the next NAS message. In step 325, the receiver entity deactivates all the EPS bearer contexts locally which are active in the receiver entity, but are indicated by the transmitter entity in the EPS bearer context status IE as being inactive.

Other issues may arise in wireless communications systems supporting CS and PS sessions when the CS domain is temporarily unavailable. In the context of LTE systems, the concept of CSFB was introduced to allow a WTRU to get CS (or non-EPS) service over E-UTRAN, (i.e., MO/MT CS calls and SMS). The mobile switching center (MSC)/visitor location register (VLR) is a combination of a switch and a database that was introduced in the 2G and 3G systems in order to provide the Circuit Switched (CS) services, and is located in the same operator's network as the MME. CSFB was enabled by the introduction of a new interface between the MME and the MSC/VLR known as the SGs interface.

For a WTRU to get non-EPS services, (e.g., SMS), a registration may be performed on both the E-UTRAN and CS domains known as a combined attach procedure. This combined registration creates an SGs association for the WTRU at the MME and the MSC/VLR. As such, an SMS message may be sent with LTE signaling to the MME using native LTE NAS messages. If the WTRU has an SGs association at the MME, the latter may then forward the message to the MSC/VLR without its verification. Similarly, for MT SMS, the MME may forward the message to the WTRU after receiving the request from the MSC/VLR via the SGs interface.

Similarly, if there is an MT CS call for a WTRU in E-UTRAN, the MSC/VLR may create a paging message towards the MME using the SGs interface. The latter may then attempt to notify the WTRU about the MT call. The WTRU may maintain an update status related to its EPS and non-EPS registration outcomes, as follows.

The WTRU may maintain an EPS status of its current registration with the network, where the EPS status may be any of the following: EU1: UPDATED, meaning the last Attach or TAU was successful; EU2: NOT UPDATED, meaning the last Attach, Service Request (SR), or TAU attempt failed procedurally, i.e., no response or a rejection was received from the MME; or EU3: ROAMING NOT ALLOWED, meaning the last Attach, SR, or TAU was correctly performed but the reply from MME was negative (because of roaming or subscription restrictions).

The WTRU may maintain a mobility management (MM) status of its current registration with the network (3G), where the MM status may be any of the following: U1: UPDATED, meaning the last location area update (LAU) was successful; U2: NOT UPDATED, meaning the last LAU failed procedurally (no significant answer was received from the network, including the cases of failures or congestion inside the network); U3: ROAMING NOT ALLOWED, meaning the last LAU ran correctly but the answer from the network was negative; or U4: UPDATING DISABLED, meaning the LAU has been disabled.

For the MM status, the subscriber identity module (SIM)/ universal subscriber identity module (USIM) may not contain any valid location area identity (LAI), temporary mobile subscriber identity (TMSI), global system for mobile communications (GSM) ciphering key, universal mobile telecommunications system (UMTS) integrity key, UMTS ciphering key, or ciphering key sequence number. For compatibility reasons, all these fields may be set to the "deleted" value at the moment the status is set to eCALL INACTIVE. However, the presence of other values may not be considered an error by the mobile station. Furthermore, if the mobile equipment (ME) supports any A5 ciphering algorithm that requires a 128-bit ciphering key and a USIM is in use, then the ME may delete the GSM $Kc_{128}$ stored at the moment the status is set to eCALL INACTIVE. The "location update status" stored on the SIM/USIM may be "not updated."

Thus, a WTRU may maintain both EPS and non-EPS statuses whenever it is performing combined registration. In addition, whenever a WTRU performs combined registration (combined Attach or combined TAU), the VLR may provide a new TMSI and location area identity (LAI) to the WTRU which are included in the TAU Accept message. The WTRU uses the TMSI when it goes to the target radio access technology (RAT) if the list of LAI, provided to it did not change. A location update is triggered between the MME and the VLR when the MME receives certain messages from the WTRU, (e.g., a combined TAU). But the periodic TAU which is governed by timer T3412 does not cause a location update over the SGs interface.

It may be possible that the CS domain becomes temporarily unavailable, for example, if the MME resets and thus loses all the SGs associations it had for the combined-registered WTRU. The same may occur if the VLR resets and then loses its SGs associations for the WTRUs that were previously combined-registered.

If the WTRU receives a Service Reject message (for example, with cause "#39—CS domain temporarily not available"), then the following actions may be taken. The WTRU may start a timer (for example time T3442) and set the EPS update status to "EU2 NOT UPDATED", and store the status. Then, the WTRU may enter the "EMM-REGISTERED. NORMAL-SERVICE state". The WTRU may not try to send an extended service request message for mobile originating services to the network until the timer T3442 expires or the WTRU sends a TAU request message. Timer T3442, which is included in the Service Reject message, may have a value that ranges from seconds, to minutes, or hours, or it may be deactivated.

With the existing WTRU behavior after receiving reject cause #39, as described hereinbefore, it is possible that the WTRU does not receive non-EPS services because of delayed combined registration. The following problems may be identified. If cause #39 is due to a VLR reset, then there may be no need to change the EPS update status as the MME still has the latest WTRU profile and context. Moreover, the MME may initiate a location update towards the VLR when the WTRU sends a periodic TAU message. In this case, the VLR may in turn provide a TMSI and location area identities in response, which are normally included in the TAU Accept message. But the WTRU may not expect these IEs in the TAU Accept message when it is performing a periodic TAU message. Thus, the WTRU behavior is unknown when it receives these IEs during a periodic TAU procedure. As a result, the combined registration may be delayed, and there may be delays associated with the non-EPS services. This delay is explained further by FIG. 4A.

Figure 4A:
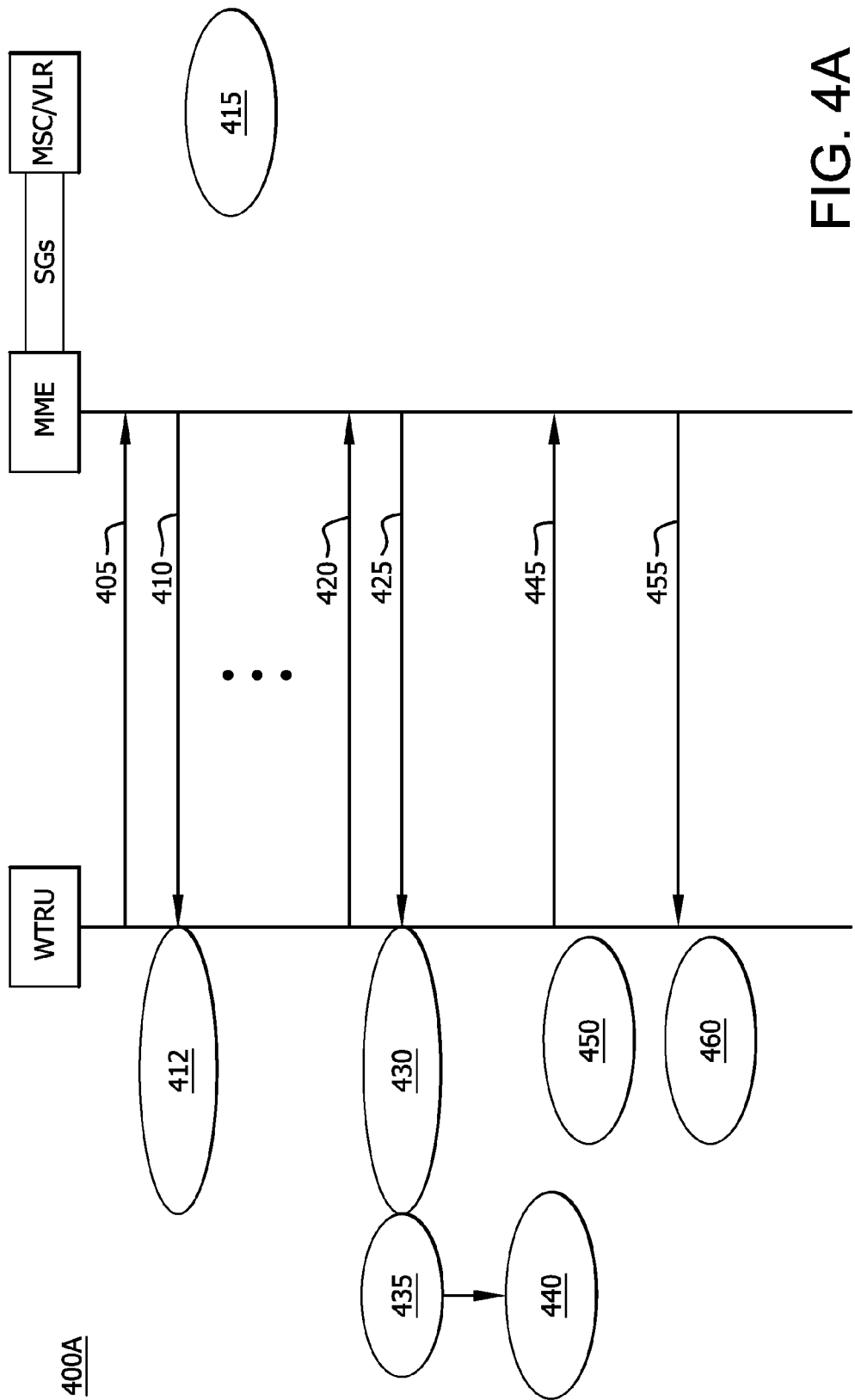
FIG. 4A is a flow diagram for a procedure between a WTRU and an MME where there is an SGs Interface between the MME and an MSC/VLR.

FIG. 4A is a flow diagram for a procedure 400A between a WTRU and an MME, including "Attach", "Service Request" and "Tracking Area Update (TAU)" procedures, where there is an SGs Interface between the MME and an MSC/VLR. Steps 412, 430, 435, 440, 450 and 460 occur in the WTRU, and step 415 occurs in the MSC/VLR.

As shown in FIG. 4A, in step 405, the WTRU may send a combined Attach message to the MME to register for both EPS and non-EPS services. In step 410, the MME may respond with an Attach Accept message, causing the WTRU's EPS Update (EU) status and MM status to be set to EU1 (UPDATED) and U1 (UPDATED), respectively, in step 412. The WTRU may have been assigned a TMSI and LAI IE as part of the Attach Accept message that it may use for CSFB, supplementary services (SS), and LCS services.

In step 415, the VLR may restart and then inform the MME about the loss of all SGs associations for all the WTRUs. A MO CSFB request in the WTRU may trigger an extended service request (ESR) message towards the MME, 420, and the MME may reply with a Service Reject message, 425, due to temporary unavailability of the CS domain. The timer T3442 set to "deactivate" or N minutes, may also be included in the Service Reject message. In step 430, the WTRU may change its EU status to NOT UPDATED, it may not modify the MM status, (which is set to UPDATED despite the contrary), and it may start timer T3442 as indicated in the Service Reject message. The timer may also have a value "deactivate", which implies that the timer may not be started.

In step 435, when the WTRU goes to EMM-Idle mode, the WTRU may start its periodic TAU timer (T3412) running. In step 440, the timer T3412 may expire before timer T3442. If that is the case, then its expiry may trigger the periodic TAU procedure by the WTRU sending a TAU message and setting the update type to periodic update, in step 445. After sending the TAU message, in step 450, the WTRU may stop timer T3442 (amongst other timers) if it is running. In step 455, the MME may respond with a TAU Accept message, and in step 460 the WTRU may set its EU status to UPDATED.

If the MME does not autonomously perform a location update towards the VLR when it receives the TAU with update type set to periodic, the WTRU's combined registration may not be performed and the WTRU may not know that there is a problem with the SGs interface, since the MM status is U1 (UPDATED). There is no existing standard procedure and no action is specified to be taken by the WTRU when T3442 expires.

If the CS domain is not available, other procedures may also be affected, (e.g., the MO SMS procedure which is performed by sending the uplink (UL) TRANSPORT NAS message). But in the current WTRU behavior when receiving cause #39, it is specified that the WTRU may not attempt an ESR until the combined registration is performed. But this does not stop other procedures, (e.g., MO SMS) which may not succeed.

In addition, if the SGs interface is down and the WTRU attempts to send an SMS message with the UL NAS TRANSPORT message, there is currently no message back from the network to indicate the success or failure of the procedure. This is because the behavior of the MME is such that it removes the NAS header and forwards the encapsulated SMS message to the VLR. Any retransmission and errors are handled by the SMS layer. As such, if the WTRU sends an SMS message which does not arrive at its destination due to the SGs being faulty, the WTRU's SMS entity may retransmit without success since a combined registration may be needed to solve the problem.

The following embodiments define new WTRU and MME behavior to handle the various situations that arise when the SGs Interface, or CS domain, is unavailable.

Figure 4B:
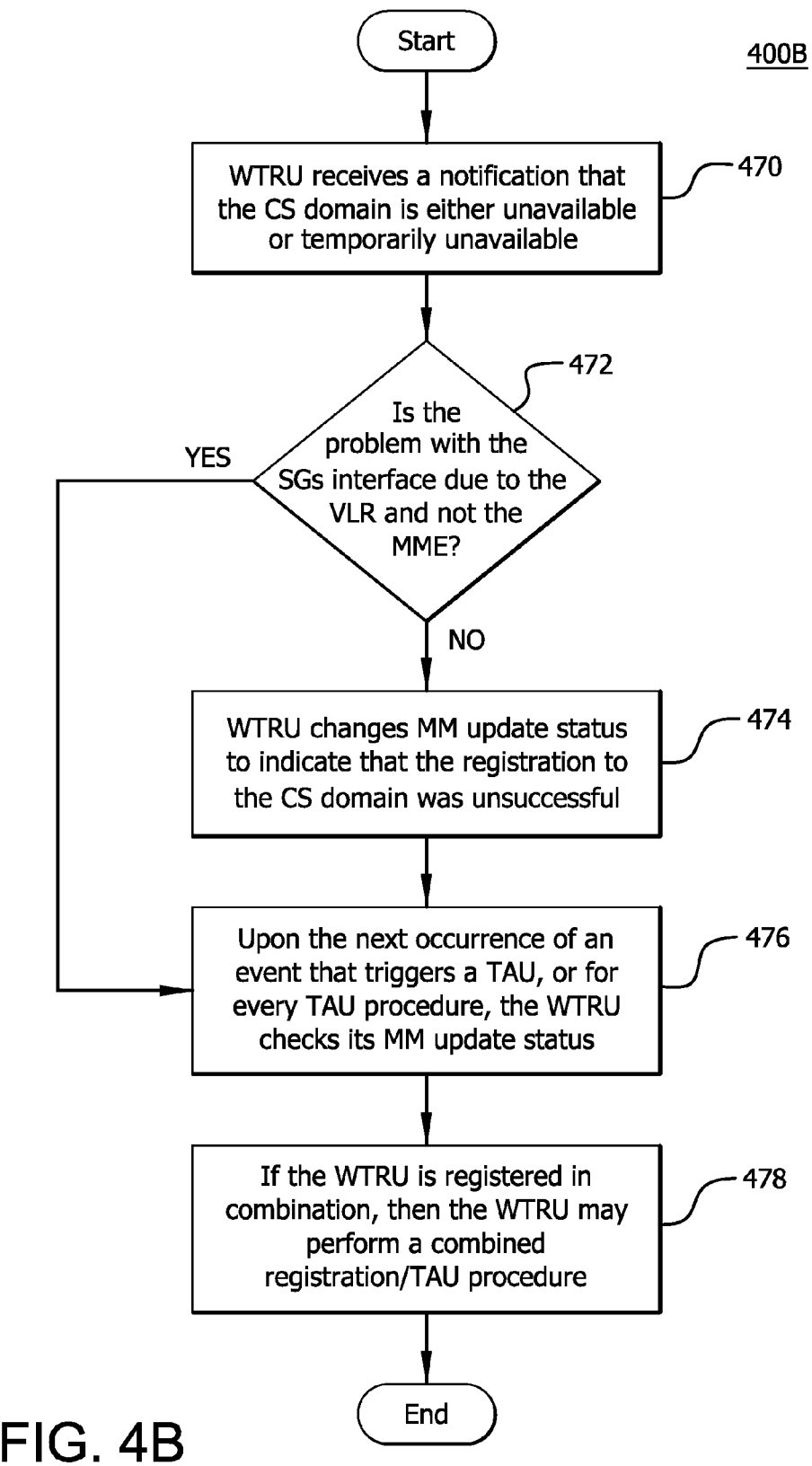
FIG. 4B is a flow diagram for a procedure performed by a WTRU when if is informed that the CS domain is unavailable.

One embodiment is illustrated in FIG. 4B. FIG. 4B is a flow diagram for a procedure 400B performed by a WTRU when if is informed that the CS domain is unavailable. In step 470, the WTRU is informed that the CS domain is either unavailable or temporarily unavailable. For example, when the WTRU tries to contact the MME for service, it may receive a Service Reject message with a cause value equal to "CS Domain not available" or "CS domain temporarily not available".

In step 472, the WTRU determines if the problem with the SGs Interface is due to the MSC/VLR and not the MME. This determination is based on the notification from the MME. If the cause value is "CS Domain not available", then that means there is a problem with the SGs interface and the MME can't connect. If the cause value is "CS Domain temporarily not available", then the SGs Interface is fine but there may be a problem with the MSC/VLR.

If the problem is not due to the MSC/VLR, then in step 474 the WTRU changes its mobility management (MM) update status to indicate that the registration to CS domain was unsuccessful. For example, the WTRU may change its MM update status to U2: NOT UPDATED.

The WTRU's EU status may be unchanged (i.e., it remains set to EU1: UPDATED) if the problem with the SGs is due to the MSC/VLR and not the MME, proceeding to step 476. In step 476, upon the next occurrence of an event that triggers a TAU, or for every TAU procedure, the WTRU may check its MM update status. In step 478, if the WTRU is registered in combination, (or not, depending if the previous TAI did not have non-EPS services), then the WTRU may perform a combined registration, (e.g., combined TAU), procedure. The combined registration procedure involves setting the update type to "combined TA/LA updating with international mobile subscriber identity (IMSI) attach" or "combined TA/LA updating", depending on the scenario.

According to another embodiment, if the unavailability of the CS domain is due to problems in the MSC/VLR, then the WTRU may consider any allocated temporary mobile subscriber identity (TMSI) and LAI as invalid.

According to another embodiment, if the Service Reject is due to the WTRU sending an ESR for an emergency call, then the WTRU may change its RAT to a CS RAT where it may place an emergency call. The WTRU may reselect to a CS RAT if a mobile originated (MO) CS call is requested that is not for emergency purposes. This may always be done regardless of the WTRU's mode of operation, or it may be done if the WTRU is operating in a mode for which the CS domain is preferred or the WTRU is voice centric, and there is no support for internet protocol (IP) multimedia subsystem (IMS) voice calls (or other forms of voice over IP). The unavailability of IMS voice calls may also mean unsuccessful registration to the IMS network.

According to another embodiment, if the WTRU receives a reject message with cause #18—"CS domain not available", then the WTRU may perform a combined TAU whenever a TAU procedure is initiated for any reason. The WTRU's behavior, (i.e., with regard to performing combined registrations), may return to the expected behavior upon the first successful combined registration procedure.

According to another embodiment, the WTRU may perform a combined registration upon the expiration of timer T3442 (i.e., expiration of this timer will trigger a combined registration). This may occur if the WTRU is in connected or idle mode.

According to another embodiment, when the WTRU receives cause #39, it may not send ESR until timer T3442 expires or a TAU Request is sent. The WTRU may not send the ESR before a combined TAU. Thus, the WTRU may trigger the combined TAU upon expiry of T3442 and then decide if ESR and/or other non-EPS services may be requested based on the result of the update. Moreover, if the timer T3442 is deactivated, (or has a value set to 'deactivated'), then the next TAU may be a combined TAU. Based on the results, the WTRU may decide if ESR or other procedures related to non-EPS services may be initiated.

According to another embodiment, the EMM may inform the SMS entity, (and/or other entities that are affected by the unavailability of the CS domain), about the unavailability of the CS domain. Thus, the affected entities may not initiate any procedure that requires the SGs interface until a combined registration is successfully performed. Moreover, the EMM entity may not initiate the UL NAS TRANSPORT procedure when it knows about the unavailability of the CS domain. For example, if the WTRU wants to send an SMS message when it is in Idle mode, the WTRU first sends a Service Request (SR) procedure and then sends the UL NAS TRANSPORT which encapsulates the SMS message. Thus, the SR procedure may not be initiated due to SMS if the EMM, (and/or SMS and other entities), know about the unavailability of the CS domain.

This embodiment may also apply to other services, (e.g., location services). That is, the EMM may inform all affected entities in the WTRU about the unavailability of an interface between the MME and a peer entity in the network. No NAS procedures may be triggered to access that service until the interface in question is restored. For example, the WTRU may not send a SR message to transport information related to location services via an UPLINK RELIABLE TRANSPORT message and an UPLINK RELIABLE TRANSPORT RESPONSE message which are used for location services. Moreover, procedures such as CSFB procedures may have a higher priority over any ongoing procedure related to location services. Thus, the WTRU may choose to ignore an ongoing transport of location service information and continue with a pending CSFB request.

According to another embodiment, the EMM entity may inform the MM entity, (and/or other entities that are affected by the unavailability of the CS domain, e.g., SMS, etc.), that the CS domain is now available. At this point, the WTRU may start sending ESR or may initiate the UL NAS TRANPSORT procedure.

According to another embodiment, if the MME receives a reset indication from the MSC/VLR, then the MME may initiate a location update on the SGs interface when it receives any type of TAU, (i.e., regardless of the update type that is set by the WTRU), from a WTRU which was previously combined registered. In addition, if the location update over the SGs is successful, the MME may include any allocated TMSI and/or LAI in the TAU Accept message regardless of the update result type set by the MME. The MME may also set the update result type to something different from what is expected by the WTRU. For example, if the WTRU successfully performs a periodic TAU, it expects a TAU Accept from the MME with the update result set to "TA updated."

The MME may set the update result to "combined TA/LA updated" if the MME initiated the location update towards the MSC/VLR on the SGs interface. When the WTRU receives the TAU Accept, it may use either the update result type to learn about the status of its combined registration, or it may conclude about its combined registration based on the presence (or absence) of an LAI IE.

If the update result is set to "combined TA/LA" then the WTRU may conclude that it is successfully registered for both EPS and non-EPS services. The WTRU may change its MM status to U1 updated and may handle the allocated LAI and possibly the TMSI as previously described when the WTRU's combined registration is successful with these IEs included. If a TMSI is not included in the TAU Accept, the WTRU's behavior may be the same as previously specified when the registration is successful without a new TMSI being included.

According to another embodiment, if the update result is "TA updated" and the TAU Accept contains an LAI, then the WTRU may consider its combined registration as successful. The WTRU may change its MM status to U1 updated and may handle the allocated LAI and possibly the TMSI as previously described when the WTRU's combined registration is successful with these IEs included. If a TMSI is not included in the TAU Accept, the WTRU's behavior may be the same as previously specified when the registration is successful without a new TMSI being included.

According to another embodiment, more details may be provided in the reject causes to indicate the source of the problem for the unavailability of the CS domain, (i.e., whether it is the MME that has restarted or the MSC/VLR). A new reject cause may be introduced to explicitly indicate the cause of the problem so the WTRU may take specific actions. For example, if the MME is the entity that has restarted, then providing this information to the WTRU may cause a change to the EU update status and not the MM status. Moreover, the WTRU may later perform a combined registration and may set the update type to "TA/LA updating" since it is already registered to the CS domain.

According to another embodiment, the value of the timer T3442 may be used to indicate the source of the problem. For example, setting the value of the timer to "deactivated" may be used to inform the WTRU that the MME is the source of the problem, and the WTRU may perform a combined registration. Other values for the timer may be used to signal this scenario or other scenarios. For example, other values may be used to indicate that the MSC/VLR is the cause for the unavailability of the CS domain. The WTRU may then behave as explained earlier.

According to another embodiment, a new message may be defined to inform the WTRU about the unavailability of a certain domain or interface when the procedure is not CSFB. For example, the WTRU may send an UL NAS TRANSPORT message for MO SMS. If the CS domain is not available (or the SGs interface is not functional due to errors at either MME or MSC/VLR) then the WTRU may be informed about the problem using the new message.

A new generic message may be defined to signal such problems for all interfaces depending on the values of certain IEs. For example, a new NAS message called SERVICE UNAVAILABLE NOTIFICATION may be defined to indicate to the WTRU the unavailability of a domain or interface. An IE, (e.g., Notification Type), may be included in this message and depending on its value, the WTRU may be notified about unavailability of the CS domain, (or the SGs interface), or the unavailability of the interface between the MME and a network node such as that for location services. The MME may send this message when it receives a NAS message from the WTRU that requires forwarding over a certain interface. Upon reception by the WTRU, the triggering entity may be notified about the error and the procedure may not be re-attempted until the interface is restored, (e.g., by some sort of registration or a notice from the network). Moreover, a timer may be included to indicate when the WTRU may re-attempt the unsuccessful procedure or re-attempt a registration which if successful may allow initiation of the procedure.

Another way of achieving this procedure is to use an existing NAS message to indicate the problem. For example, the EMM INFORMATION may be used to achieve this. The EMM entity may also inform all other affected entities when a particular message indicating an error in an interface is received. For example, if the WTRU is informed about unavailability of the CS domain when the MME receives UL NAS TRANSPORT, then the EMM may inform the MM entity so that ESR may not be initiated until a successful combined registration is performed.

In any of the above embodiments, the combined registration may take any of the conventionally specified types of combined registrations. The following are provided as examples: combined attach with attach type set to "EPS/IMSI attach; combined TAU with update type set to "combined TA/LA updating; or combined TAU with update set to "combined TA/LA updating with IMSI attach.

Moreover, the above embodiments also apply to WTRUs that are registering for the first time for both EPS and non-EPS services. Alternatively, in this case, the regular behavior for unsuccessful registration for non-EPS services only may be followed by the WTRU, (e.g., the registration attempt counter or a similar counter is incremented up to a maximum value after which other actions may be taken by the WTRU). In addition, there may be a time limit between each attempt. This may also be applied to WTRUs that have been previously successfully registered for both EPS and non-EPS services and later receive a reject message with cause #39, (CS domain temporarily not available), or #16, (MSC temporarily not reachable), or #18, (CS domain not available).

All of the above embodiments and examples apply to the case when the CS RAT is both 3GPP or non-3GPP, and the same embodiments and examples apply for non-EPS services, (CSFB, SMS, SS, etc.), to the case when there is a different interface between the MME and a non-3GPP network, e.g., CDMA2000 (1×RTT). The above examples may be used in any combination.

A problem that may occur in wireless communications systems supporting CS and PS sessions, is that significant delays may occur when performing CSFB for emergency calls.

Figure 5A:
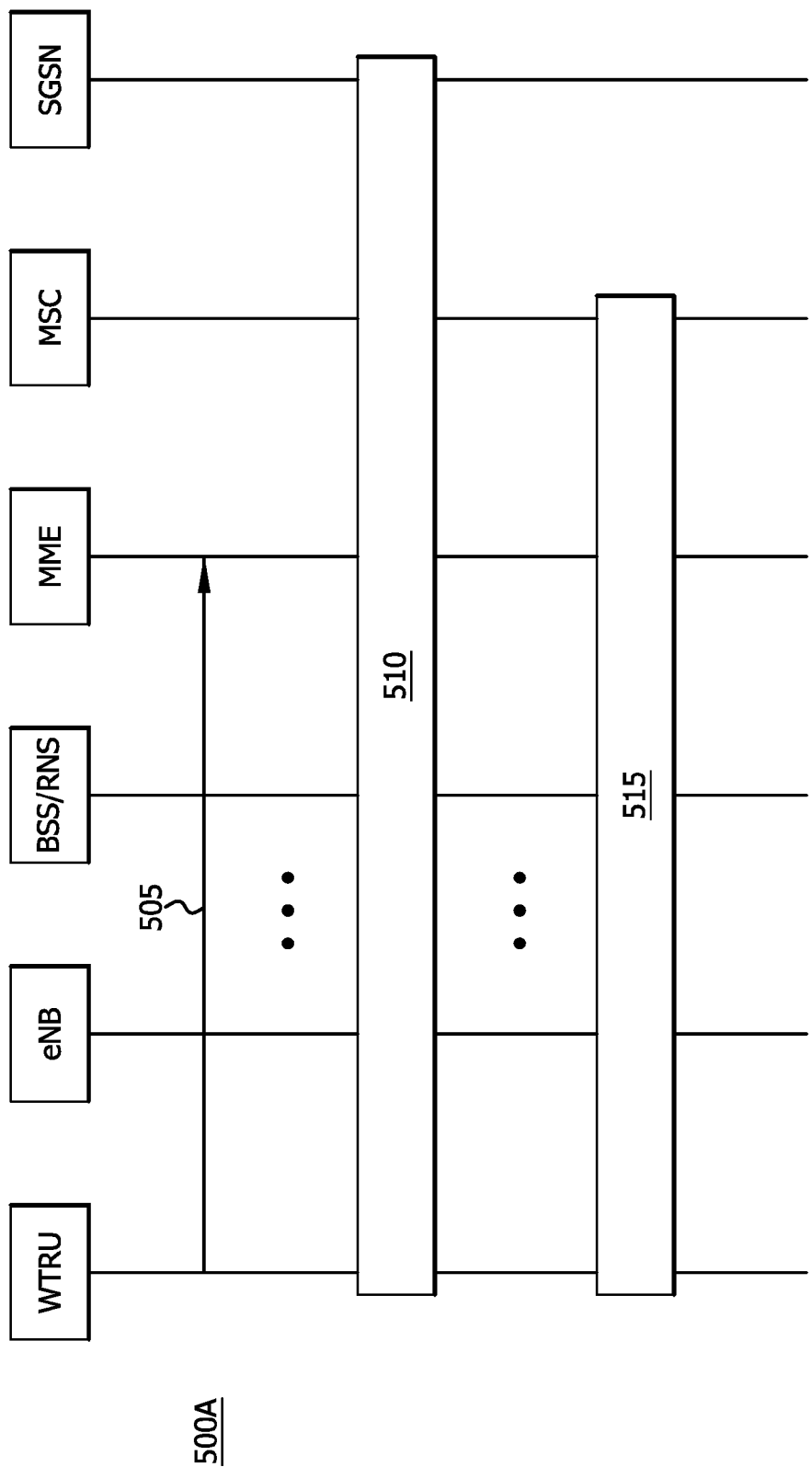
FIG. 5A is a flow diagram of a procedure in response to a WTRU placing an emergency call.

FIG. 5A is a flow diagram of a procedure 500A in response to a WTRU placing an emergency call. Some steps of the procedure are omitted. If the WTRU is attached for both EPS and non-EPS services and wants to place an emergency call, in step 505 the WTRU may send an ESR message. The WTRU may set the service type to "mobile originating CS fallback emergency call" or "1×CS fallback emergency call" depending on the CS domain type supported by the WTRU. If PS HO is supported in the target RAT, then in step 510 the WTRU performs a PS HO before continuing with placing the CS emergency call. In step 515, the CS call establishment procedure is initiated in order to place the CS emergency call. As can be seen from FIG. 5A, the CS call can only be initiated after the PS HO completes. However, since the call requested is an emergency call, it is important to reduce any delays to a minimal level.

Another scenario in which CSFB may be delayed occurs when a WTRU requests a service from a closed subscriber group (CSG) cell that it is not allowed to be on. This can happen, for example, when the WTRU's subscription has expired but the WTRU is not yet updated with the subscription information, or when a WTRU is on a hybrid CSG cell and priority is given to subscribers.

In this case, the WTRU's ESR may be rejected with cause code #25 and the WTRU's behavior is such that it has to look for a suitable cell as it enters limited mode. Thus, the WTRU, after finding a suitable cell, will need to re-start the procedure for CSFB again. Thus, this causes delay because the CSFB has not been processed yet. Reducing the delay is especially important if the CSFB is triggered due to an emergency call.

If the WTRU knows, based on its fingerprint, that it is near a 3G HNB/CSG cell, then it will send a proximity indication to the current serving eNB (E-UTRAN) which might configure the WTRU with measurement gaps in order to read the system information messages in UTRAN in order to acquire the CSG identity. Since reading the system information blocks (SIBs) on UTRAN system will require some time, existing solutions proposed to reduce the delay to a minimal level include: 1) The WTRU doesn't send a proximity indication when it is performing CSFB requests, if it knows that there is at least one other macro cell available in the legacy RAT where it can place its CS call; 2) the WTRU sends its proximity indication and the network doesn't request the WTRU to read system information messages from any HNB, if the network knows about availability about at least one macro cell of the legacy RAT; or 3) both WTRU and the network consider any HNB in the target RAT as the least priority cell in order to avoid possible system information reading and access check.

According to an embodiment, the delays for CSFB Emergency calls may be reduced by not performing a PS HO and redirecting the WTRU to the target system. In order to reduce the delays related to CSFB procedure for emergency calls, the LTE network may not perform PS HO, (even if the target network supports it), and redirect the WTRU to the target system. This may be achieved in many different ways, as described in the following embodiments.

Figure 5B:
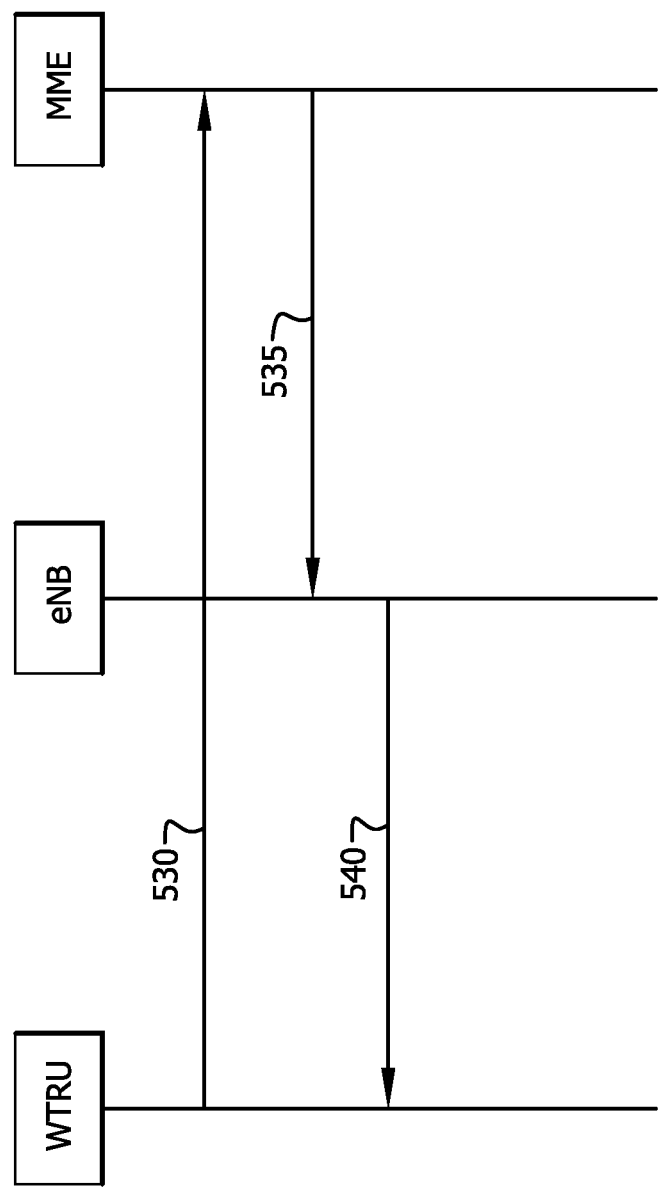
FIG. 5B shows a flow diagram of a procedure for reducing delay in the CSFB procedure for emergency calls.

FIG. 5B shows a flow diagram of a procedure 500B for reducing delay in the CSFB procedure for emergency calls. In step 530, the WTRU sends a ESR for an emergency call. The ESR message may have the service type set to "mobile originating CS fallback emergency call" or "1×CS fallback emergency call". In response, the MME does not perform PS HO for the WTRU. Instead, the MME sends a WTRU Context Modification Request to the eNB in step 535 in order to redirect the WTRU directly to the CS domain. This is accomplished in step 540 by the eNB sending to the WTRU either a network assisted cell change order message or an RRC connection release message, where the message includes the redirection information for the CS domain. The WTRU then attempts to access the CS domain and continue first with establishment of the CS call for emergency services.

The WTRU may indicate to the MME that PS HO is not preferred. This can be done by including an EPS bearer context status IE in the ESR and setting the values for all contexts to indicate that they have been deactivated. Alternatively, the WTRU can include a new IE to indicate that PS HO is not preferred.

Other scenarios in which delay can be seen include when a WTRU is on a CSG cell for which the subscription has expired. In this case, an ESR can be rejected with cause #25 and the WTRU would need to find a suitable cell and then send the ESR again. In order to reduce the CSFB delay in such a scenario, (for normal CS calls or for an emergency CS call request, which is identified by having the request type in the ESR set to mobile originating CS fallback emergency call or 1×CS fallback emergency call), the following embodiment may be used as means to reduce call setup delay.

According to one embodiment, the MME may ignore the expiry of the subscription for the exceptional case of CSFB requests and accept the ESR. The WTRU can later be updated with the latest subscription information, for example, upon subsequent access retries on the CSG cell. Thus, it is proposed that the reject cause #25 may not be applied to CSFB related procedure or signaling.

According to another embodiment, the WTRU may also be handed over to another allowed/suitable LTE cell from which the CSFB procedure is continued. In this case, the ESR is not rejected and the WTRU does not have to go through cell reselection, hence avoiding potential delays. The network then continues the ESR procedure from the target cell on which the WTRU has completed the intra-LTE handover.

According to another embodiment, the network may conditionally reject, (or accept), the ESR procedure. That is, the network may allow the ESR procedure to go through while indicating to the WTRU that the CSG subscription has expired. This can be achieved in RRC or NAS signaling or a combination. For example, the network can send the inter-system change message, (e.g. mobilityFromEUTRACommand), and include an indication of the WTRU's subscription, (e.g. expired). Thus the WTRU may continue the CSFB procedure but also use the provided indication to update the list of allowed CSGs. If provided within RRC messaging, the RRC layer can provide the NAS with such indications so that the appropriate update is performed on the allowed CSG list. This can be done, for example, with one bit in which a specific value indicates expiration of a subscription for the CSG cell. Additionally, the MME can provide such an indication over an interface, (such as the S1-AP interface), to the eNB which can use such indication to take certain actions such as including a one bit indication in the RRC messages.

The WTRU and the network may reduce any potential delays that are related to falling back to a target cell which is a CSG cell. To accomplish this, according to another embodiment, the WTRU may prioritize GERAN since CSG is not supported there. As such, any preliminary access check that is needed to be performed by the WTRU is automatically avoided.

The WTRU may not send a proximity indication to the eNB to indicate that it is close to a target CSG cell of UTRAN, or any other system. By doing so, the network will not schedule the WTRU for measurement and system information reading on a target UTRAN CSG cell. Avoiding this will eliminate potential delays if a UTRAN CSG cell needs to be verified for access eligibility by the WTRU and the network. The WTRU may take such an action if it knows that there are other neighboring inter-RAT macro cells. Alternatively, even if the WTRU sends a proximity indication to inform the network that it is near a CSG cell, it is proposed that the network should not act upon this indication and therefore not schedule gaps for the WTRU to go and read system information message in order to perform preliminary CSG access check. Similarly, this can be done if the network knows that there are other UTRAN macro cells around the WTRU.

According to another embodiment, if CSFB is performed with network assisted cell change order or by releasing the RRC connection, (may be with redirection information), and system information of at least one target cell is provided to the WTRU, then the following may be performed.

In this case, the WTRU may prioritize cells that may not require a change in location area identity (LAI), (e.g. the WTRU may have one in LTE). This may be done by checking the LAI that the WTRU has against the LAI of each potential target cell which may be derived from the provided SIBs or system information. Moreover, the WTRU may give priority to macro cells within the desired LAI in order to avoid possible access reject due to CSG subscription invalidity. This may be done even if the WTRU has the associated CSG ID in its lists, and regardless of the signal power and/or quality received from CSG cells or cells that fall out of the desired LAI. Thus, the cell selection rules may be overruled in this case. Alternatively, there may be a minimal threshold beyond which the WTRU may not apply, for example, preconfigured thresholds in the WTRU or signaled using RRC or NAS messages. Cells that fall within a desired LAI, provided over LTE, may avoid delay due to possible location area update (LAU) requests.

If the WTRU receives signals from the macro cells within the desired LAI which are weak or fall below a certain threshold, the WTRU may give priority to a CSG cell within the LAI. This prioritization is based on the criteria of CSG permission (based CSG ID check, or otherwise signaled to the WTRU during the inter-system change).

The last priority may be given to cells utilizing CSFB that belong to a different LAI in which macro cells may have higher priority than CSG cells. The above examples and embodiments for CSFB prioritization described hereinbefore may be applied in any combination.

FIG. 6 is a flow diagram of a procedure 600 when the WTRU performs an inter-system change when a location area has changed. In step 602, the MSC/VLR sends a Paging Request to the MME (e.g. SGsAP-Paging-Request message). In step 604, the MME sends a Paging Request to the eNB and in step 606, the eNB sends a Paging message to the WTRU. In steps 608, the WTRU responds to the Paging message by sending a ESR message to the MME. In step 610, the MME sends a WTRU Context Modification Request (with CSFB indicator) to the WTRU. In step 612, the WTRU sends measurement reports to the eNB.

If the WTRU performs an inter-system change, possibly with PS HO, and finds out that the location area has changed, the location area update procedure is performed in step 615. In step 620, the CS MO voice call is initiated by the WTRU toward the MSC. As can be seen from FIG. 6, the location area update procedure is performed before a CS voice call can be performed.

In order to avoid this problem, according to another embodiment, the WTRU may use, (in the target CS cell/RAT/system whenever performing CSFB), its IMSI in its initial message, (e.g. Paging response in MT case or CM Service Request in MO case), for both mobile originating and mobile terminating cases. As such, even if the MSC/VLR has changed, the IMSI in the CM Service Request will uniquely identify the WTRU in the new MSC/VLR and hence a location update is not necessary before the call is set up.

Figure 7:
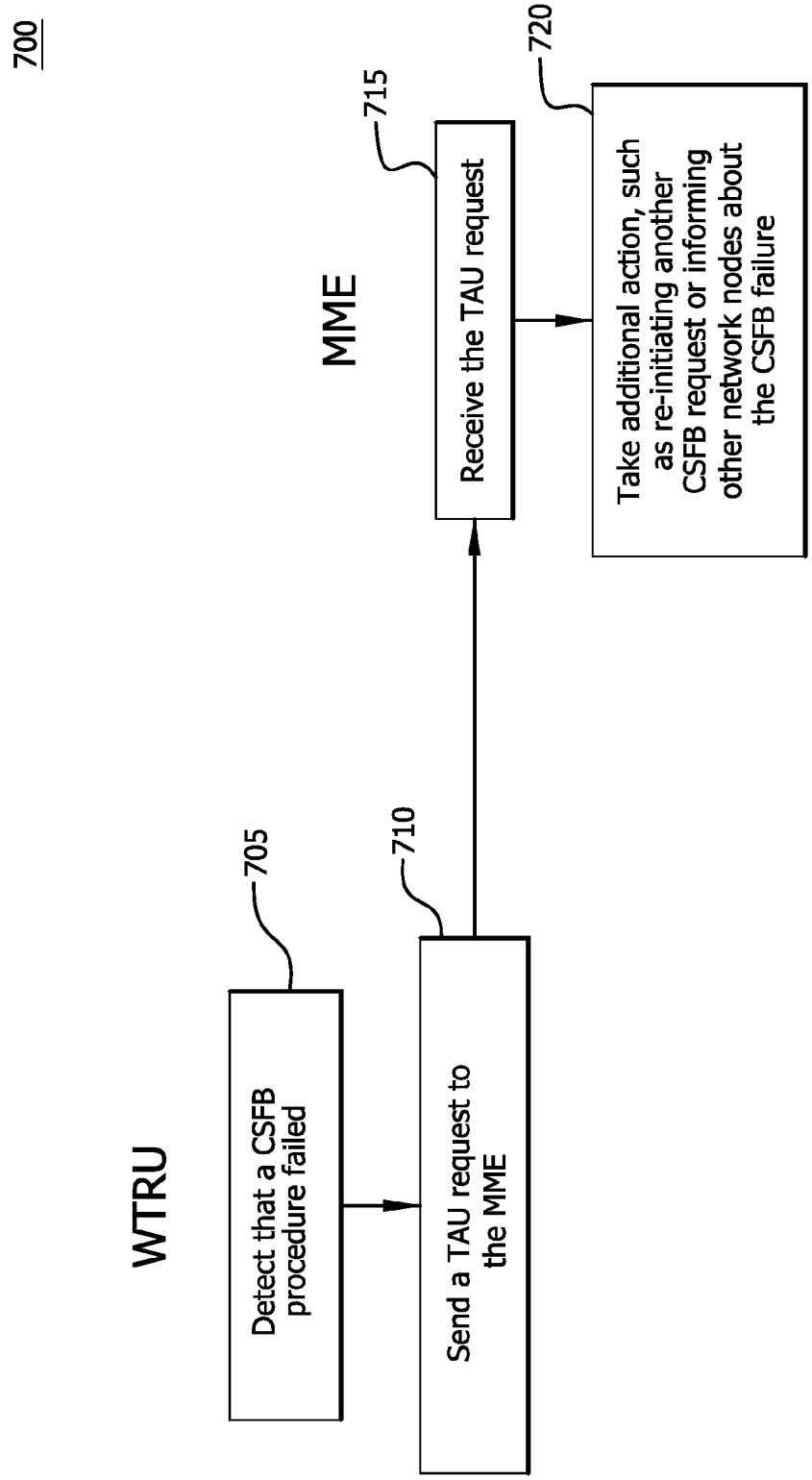
FIG. 7 is a flow diagram of procedure for a TAU being triggered in response to a CSFB failure.

According to another embodiment, a TAU may be triggered when CSFB fails. FIG. 7 is a flow diagram of a procedure 700 for a TAU being triggered in response to a CSFB failure. In step 705, the WTRU detects that a CSFB procedure failed. For example, the NAS may use indications from the RRC that the CSFB procedure has failed to send the TAU request. In step 710, the WTRU sends a TAU request, possibly with the type being a combined TAU, in response to the CSFB procedure failure. This procedure may allow the WTRU to resume in LTE with all its contexts it previously had before the CSFB procedure initiation. In step 715, the MME receives the TAU request. In step 720, the MME uses the TAU request as an indication of the failure and may take additional actions such as re-initiating another CSFB request or informing other network nodes about the failure e.g. (the SGSN or MSC/VLR).

Another problem that may occur in wireless communications systems supporting CS and PS sessions, is that delays may occur when performing CSFB for a CS call that terminates at another CFB capable WTRU.

It is possible that a WTRU that is combined attached, (for EPS and non-EPS services), originates a CSFB procedure in order to place a CS voice call whereby the called party is another CSFB capable WTRU that is also in LTE coverage. Thus, for the voice data to be exchanged between calling WTRU, (known as WTRU 1), and the WTRU that is being called, (known as WTRU 2), there is need to perform two CSFB procedures, one mobile originating (MO) CSFB procedure that triggers a mobile terminated (MT) CSFB procedure.

The MO CSFB includes signaling associated with WTRU 1's request to place CSFB, which includes some optional procedures, for example, a PS handover may occur if WTRU 1 and the network support PS handover. Also, if the MSC/VLR that receives the CM Service Request is different, then the CM Service Request by WTRU 1 may be rejected and the WTRU 1 may perform a LAU before it can continue with the CS call. At this point, the WTRU 1 may send the Call Setup message to the MSC/VLR, which contains the address of the called party, WTRU 2.

The MSC/VLR verifies the called party address and sees that there is an SGs association for WTRU 2, (i.e. the MME has triggered non-PS registration over the SGs interface due to the reception of a combined registration from WTRU 2 in LTE coverage). Accordingly, a MT CSFB procedure is triggered towards WTRU 2. In the mean time, WTRU 1 is waiting since WTRU 2 is still in LTE coverage. Its only after WTRU 2 completes the inter-system change that voice data can be exchange over the CS domain.

The signaling described above creates delays associated with this scenario and prolongs the waiting time for WTRU 1. This waiting time/delay may be reduced if the CSFB procedure for WTRU 2 is initiated earlier and with fewer unnecessary delays.

According to one embodiment, the delays for CSFB to CSFB calls are reduced by initiating the second CSFB call sooner. For a mobile originated (MO) CSFB request that triggers a mobile terminated (MT) CSFB procedure, the delay may be reduced if the CSFB procedure for WTRU 2 is started earlier than usual, before WTRU 1 completes its CSFB procedure. To perform such a procedure, when WTRU 1 is performing an MO CSFB procedure, (i.e. by sending an Extended Service Request (ESR) to the MME), the WTRU may include all the necessary information regarding the called party in the ESR. The MME, after receiving an ESR, may forward this addressing information to the MSC/VLR. The MSC/VLR checks the address of the called party to see if there is an SGs Interface association at the MSC/VLR, or if the called party is a fixed line number or an emergency call center.

If the called party is another WTRU with a valid SGs association, the MSC/VLR may start a MT CSFB procedure for this WTRU by sending the necessary message, the SGsAP-Paging-Request, over the SGs interface. The MSC/VLR may indicate to the MME that the call is triggered by another CSFB procedure. The MME may use this information to take any necessary action that can speed up the MT CSFB procedure. Moreover, the MME may inform the WTRU that the MT CSFB is from another CSFB capable WTRU. The WTRU may use this indication to speed up the procedure e.g. start taking measurements and sending reports. This functionality may be achieved by using any of the following embodiments.

In another embodiment, WTRU 1 sending an ESR may include the necessary information that may be used to identify the destination. For example, some or all of the Call Setup message can be included in the ESR in the form of a new IE or a new container. Alternatively, the WTRU 1 may not include this information if it knows that the destination is not CSFB capable, (for example, the destination has a fixed line number or an emergency call center). In some countries mobile subscribers and fixed subscribers have distinct numbers series that may be used to determine whether the B number series refers to fixed or mobile subscriber.

In another embodiment, a new message (e.g. SGsAP-MO-CSFB-Indication) may be needed to carry this information from the MME to the MSC/VLR over the SGs interface. The MME may remove all the addressing information from the ESR and may insert it in this new message that is to be sent over the SGs to the MSC/VLR. Alternatively, the MME may send this message as an indication that a MO CSFB procedure has been triggered and the MSC/VLR is to expect a WTRU for a CS voice call. The MSC/VLR may use this indication to take statistics, (e.g. number of call failure, setup time, etc). The MME may start a timer upon the sending of this message.

In another embodiment, the MSC/VLR upon reception of this message, may verify if the destination called party is another WTRU with SGs association (this might involve interaction with other nodes e.g. HLR). If not, the MSC/VLR may take no further actions. The MCS/VLR may acknowledge the receipt of the indication from the MME by sending another message, (for example SGsAP-MO-CSFB-ACK). The MME may use this acknowledgement to take any necessary action, (e.g. stop any timer that it might have started). If the MSC/VLR has a SGs association for the called party, the MSC/VLR may trigger the SGsAP-Paging-Request towards the MME. The MSC/VLR may include an acknowledgement for the previous message sent by the MME, for example by including a one bit position in the SGs-AP-Paging-Request message.

In another embodiment, the MME may then stop any timer based on the acknowledgement received. In addition, the MME may start the MT CSFB procedure by requesting the E-UTRAN to page the WTRU, (if it is in idle mode), or by sending the CS Service Notification to the WTRU, (if it is in connected mode). In either case, the MME may indicate that this CSFB is triggered by another CSFB procedure.

In another embodiment, if the WTRU 1 has completed its CSFB procedure and is in the CS domain, the MSC/VLR may start sending some information, (e.g. ringing tone), to indicate that the call request is being processed. The MSC/VLR may choose whether a ringing tone or any other call in progress tone is used based on whether or not the WTRU 2 is a CSFB subscriber waiting for the CSFB procedure to be completed.

Figure 8A:
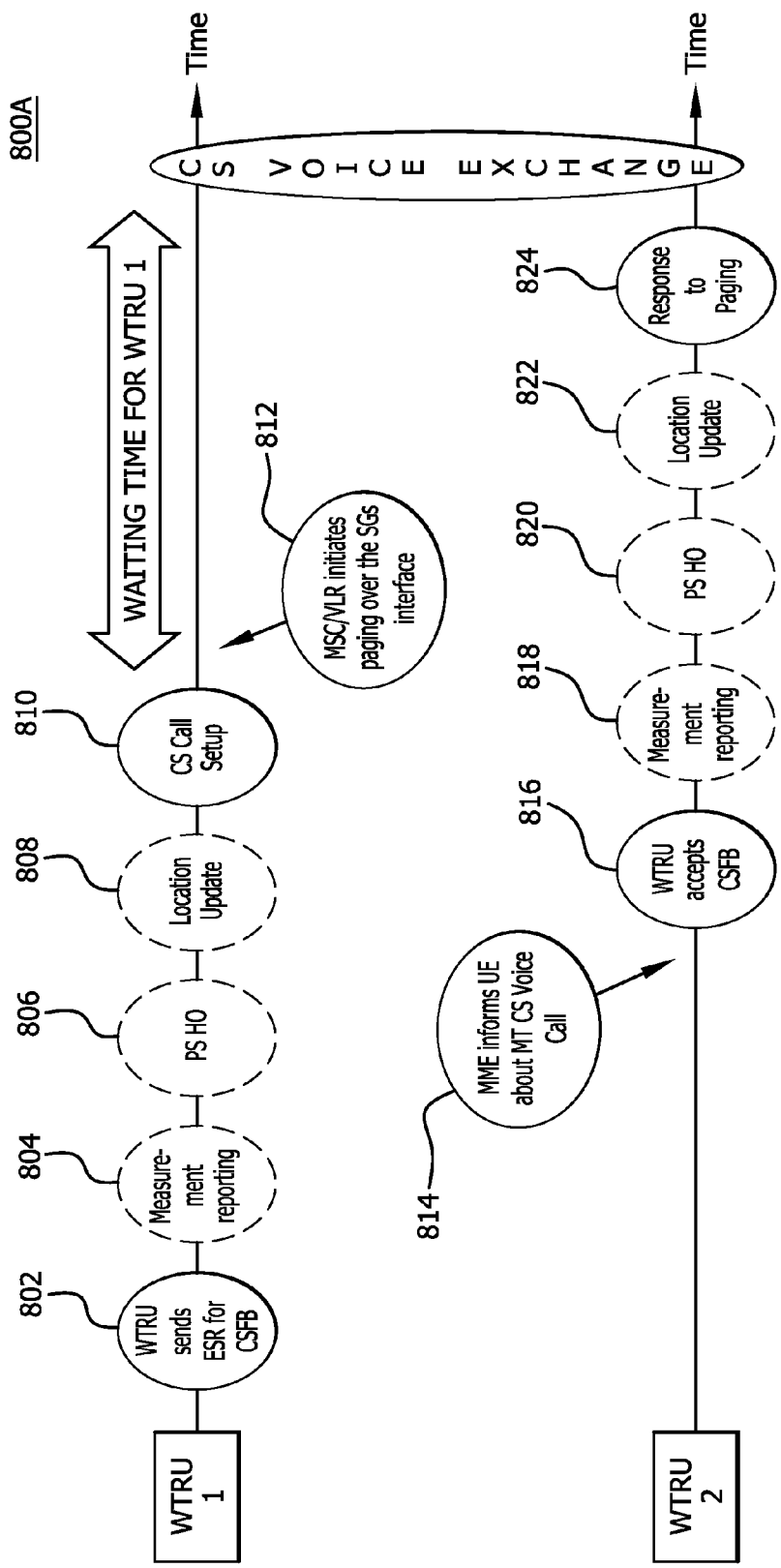
FIGS. 8A and 8B show example CSFB procedures for two CSFB calls with and without enhancements, respectively.
Figure 8B:
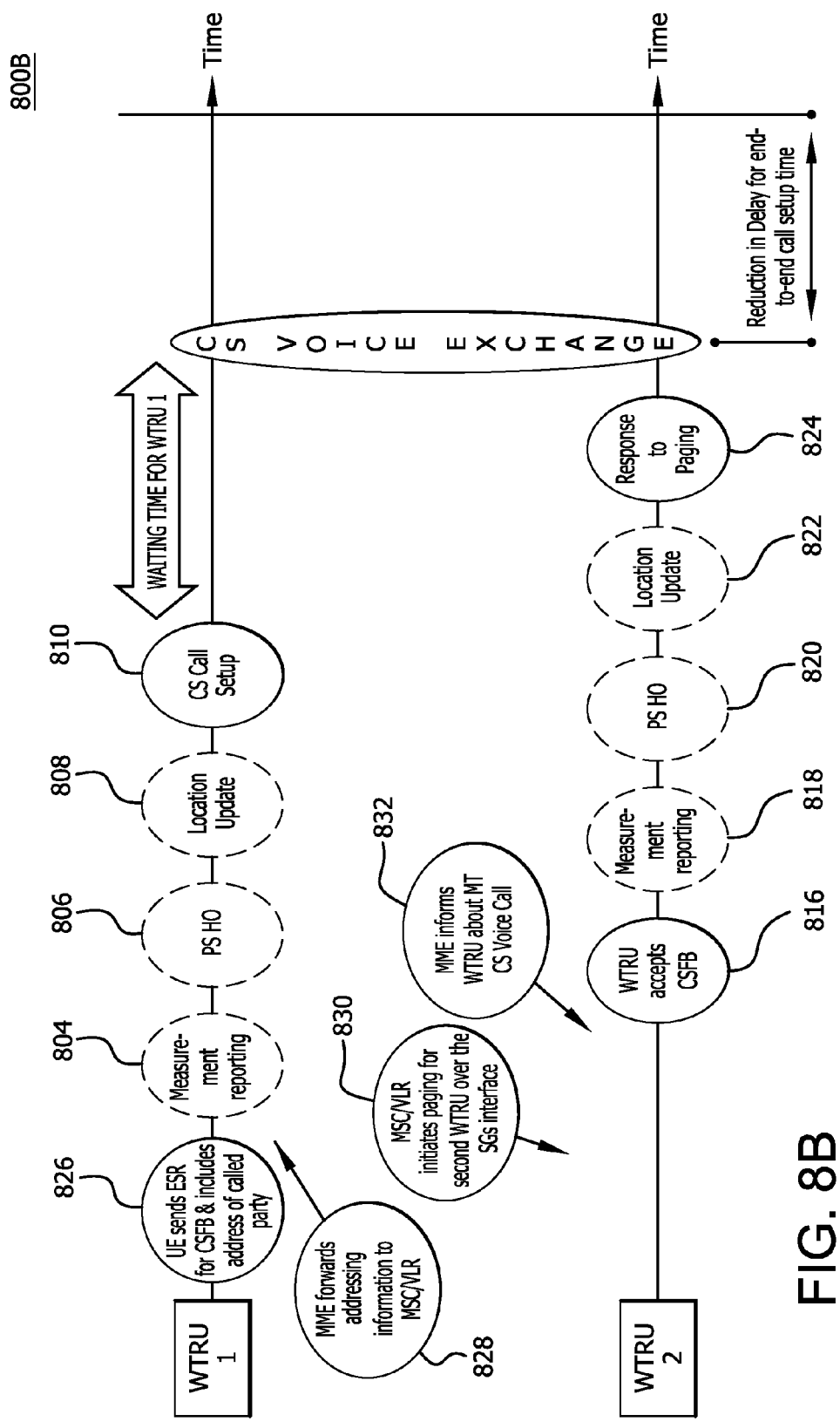

FIGS. 8A and 8B show example CSFB procedures for two CSFB calls with enhancements, 800A, and without enhancements, 800B, respectively. In FIG. 8A, WTRU 1 initiates a CSFB call back by sending an ESR for CSFB 802, providing measurement reporting 804, initiating a PS HO 806, performing a location update 808, and setting up a CS call 810. The MSC/VLR initiates paging over the SGs interface, 812. Then, the MME may inform WTRU 2 about the MT CS voice call,

814. Subsequently, WTRU 2 initiates its an inter-system change while WTRU 1 waits. WTRU 2 accepts the CSFB 816, provides measurement reporting 818, initiates a PS HO 820, performs a location update 822, and responds to paging 824.

According to an embodiment, the delays experienced by WTRU 1 while WTRU 2 initiates an inter-system change may be reduced using the procedure in FIG. 8B. Referring to FIG. 8B, WTRU 1 initiates a CSFB call back by sending an ESR for CSFB and includes the address of the called party (WTRU 2) 826. The MME forwards addressing information to the MSC/VLR 828, and the MSC/VLR initiates paging for WTRU 2 over the SGs interface, 830. In 832, the MME informs the WTRU about the MT CS voice call. In parallel, WTRU 1 provides measurement reporting 804, initiates a PS HO 806, performs a location update 808, and sets up a CS call 810. WTRU 2 accepts the CSFB 816, provides measurement reporting 818, initiates a PS HO 820, performs a location update 822, and responds to paging 824. In contrast to the scenario in FIG. 8A, the procedure in FIG. 8B reduces the waiting time for WTRU 1 for the CS voice exchange.

Another problem that may occur in wireless communications systems supporting CS and PS sessions, is that a WTRU may be made to fallback to CS when the MT call is cancelled. It may be possible that a mobile terminating (MT) CSFB request is cancelled by the caller. In this case, the MSC/VLR receives a request for a CS call from WTRU 1, the MSC/VLR initiates an MT CSFB procedure towards WTRU 2, and the MSC/VLR then receives a request by WTRU 1 to abort the CS voice call request. Thus, if the MT CSFB procedure continues, WTRU 2 may perform an inter-system change to GERAN/UTRAN, possibly with PS HO, but may not receive any CS call as it may have been aborted by WTRU 1. This inter-system change is unnecessary and should be avoided. It may cause degradation of service if PS HO is not supported, or if it is supported but the QoS provided by the target system does not match the source system. Recall that the MSC/VLR may start an MT CSFB procedure for a WTRU by sending the SGsAP-Paging-Request the over the SGs interface to the MME.

According to one embodiment, inter-system change is avoided for a WTRU when a CS paging or call request that triggered a MT CSFB is cancelled. If a CS call request that triggers a MT CSFB call is cancelled, the called WTRU (which is CSFB capable and assumed to possibly be in LTE) may not be made to perform an inter-system change even if it has been notified of the MT CSFB procedure. In order to do so, the procedure shown in FIG. 9 may be used.

Figure 9:
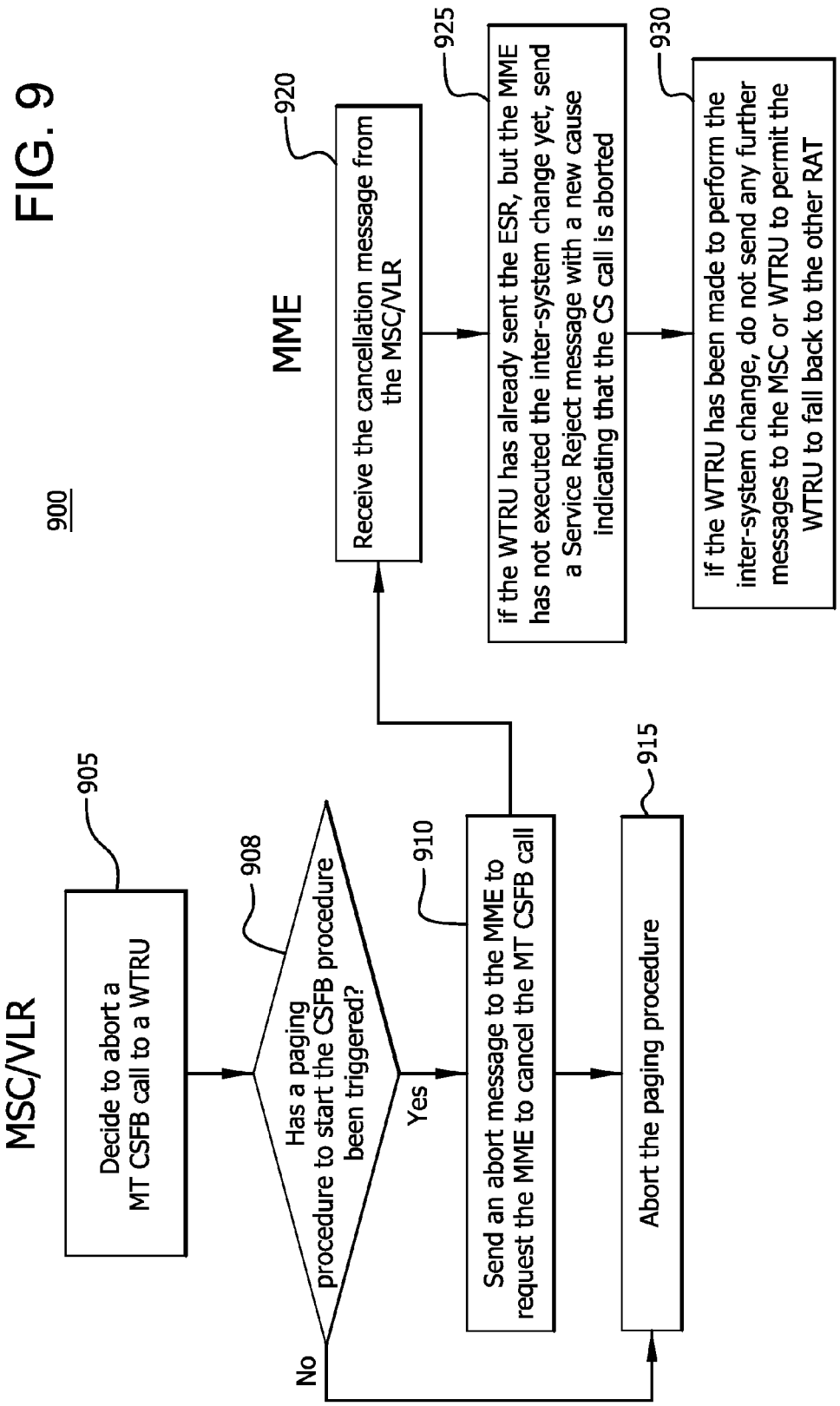
FIG. 9 is a flow diagram of a procedure for avoiding an inter-system change for a WTRU when a CS that triggered a MT CSFB is cancelled.

FIG. 9 is a flow diagram of a procedure 900 for avoiding an inter-system change for a WTRU when a CS call request that triggered a MT CSFB is cancelled. In step 905, the MSC/VLR decides to abort a MT CSFB call that has been placed to a WTRU. The MSC/VLR may make the decision to abort the MT CSFB call because it receives a request from the WTRU to abort the MT CSFB call. Alternatively, the MSC/VLR may have started a timer when it sent a paging message to the WTRU to establish the MT CSFB call, and may decide to abort the MT CSFB call when the timer times out before receiving a response from the WTRU.

In step 908, the MSC/VLR determines if a paging procedure to start the CSFB procedure has been triggered. For example, it determines if a SGsAP-Paging-Request has been sent. If the paging request has not been sent, then in step 915, the MSC/VLR aborts the paging request (SGsAP-Paging-Request) procedure. Otherwise, if the paging procedure has been triggered, in step 910, the MSC/VLR sends an abort message, (e.g. SGsAP-MT-CSFB-Cancel) to the MME to request the MME to the cancel the MT CSFB call. The MSC/VLR may start a timer after sending this message.

In step 920, the MME receives the cancellation message from the MSC/VLR. Subsequently, the MME may take certain actions to abort the inter-system change for the WTRU under consideration. In step 925, if the WTRU has already sent the ESR (i.e. the MT CSFB has been accepted) but the MME has not executed the inter-system change yet, the MME may send a Service Reject with a new cause, for example, indicating "CS Call Aborted".

Additionally, the MME may send an abort request to other network nodes such as the SGSN that are possibly part of the procedure. In addition, the MME may send an acknowledgement to the MSC/VLR to acknowledge the reception of the abort message (e.g. SGsAP-MT-CSFB-Cancel) and may also include a status IE to indicate the result of the request (e.g. "MT CSFB Cancel Success" or "MT CSFB Cancel Failure").

In step 930, if the WTRU has been made to perform the inter-system change, the MME may not send any further messages to the MSC or the WTRU. By taking no further action, the MME permits the WTRU to fall back to the other RAT. Alternatively, the MME may send an acknowledgement to the MSC/VLR and indicate that the cancel request is not successful. The MSC/VLR may use this indication to take further actions, for example, to stop any timer that has been started.

Upon reception of the Service Reject with cause "CS Call Aborted", the WTRU may take any necessary action, (e.g. the EMM entity may inform the MM entity about the abortion of the procedure). The WTRU may resume operation in LTE.

If the MME had not yet informed the WTRU about the MT CS voice request, then upon the reception of the cancel indication from the MSC/VLR, the MME may ignore the initial request and not inform the WTRU about the MT CS call. Alternatively, if the MME has requested E-UTRAN to page the WTRU for CSFB request, the MME may request E-UTRAN to abort the paging procedure. The E-UTRAN may acknowledge the request and inform the MME about a successful paging as described above.

A problem that may occur in wireless communications systems supporting CS and PS sessions, is that there may be undefined behavior for MT CSFB in Connected Mode.

A WTRU in Connected mode may be notified about a MT CSFB request using the CS Service Notification that is sent by the MME. The WTRU may request upper layers' input to accept or reject CSFB before responding with an ESR message. The response may be indicated in the CSFB response IE in the ESR message in both EMM-IDLE and EMM-CONNECTED modes. The problem identified with this is that it may be possible that a WTRU is in connected mode actively downloading a file but the user is not necessarily next to the WTRU. Thus, if the WTRU receives a CS Service Notification message and requests input from upper layers to accept or reject a call, such input might not be provided if the user is away from the WTRU. Therefore, the expected behavior is undefined (for example, it is unknown if an ESR message will be sent to the network/MME and if so then the CSFB response information element). Moreover, it is not efficient that the WTRU takes a decision on behalf of the user and accepts the call since PS HO might not be supported in the target RAT and service disruption may occur. At the same time, not providing any feedback to the MME may prevent other actions from being taken, such as the VLR may forward the call to the voice messaging centre. The following embodiment may be used independently or in any combination to address this problem.

According to another embodiment, the WTRU and MME behavior is defined for MT CSFB in connected mode when user input is requested but without a user response. The MME may start a timer after, or at the time, it sends the CS Service Notification message. The timer may be set to any value that is deemed appropriate for the scenario. For example, the value may be set to 5 seconds. If the timer expires before receiving any response from the WTRU (i.e. ESR), the MME may send a message (e.g. over the SGs) to the MSC/VLR to indicate that no response was received from the WTRU even though the MME is in contact with the WTRU. A new message may be defined or an existing message of the SGs protocol may be used with a new cause value to clearly identify the scenario. The MME may not retransmit the CS Service Notification to the WTRU if a response is not received.

The MSC/VLR may take certain actions when it receives such indication from the MME. For example, the MSC/VLR may trigger the User Determined User Busy procedure, or the Call Forwarding on Not Reachable procedure.

Upon reception of a CS Service Notification (with or without a call line identification (CLI)), the WTRU may start a timer. If no user intervention is made while the timer runs, the WTRU upon expiry of the timer may send an ESR message to indicate that no user intervention was received. The WTRU may decide to accept or reject the call based on network or user configurations. If the user accepts or rejects the call, the WTRU may stop the timer and send the ESR with the appropriate user selection; (accept or reject).

Alternatively, after the timer expires, the user may not be given the option to accept or reject a call and thus an ESR may not be sent after that point (and/or the WTRU may send the ESR as explained above without user intervention). However, if the network side considers the MT CSFB as unsuccessful or being aborted, the network may ignore or reject any ESR that might be received from the WTRU, such as due to delayed user intervention. Thus, the MME may ignore the message.

Alternatively, the MME may reject the ESR with a Service Request message that may include a new reject cause to indicate that the network has aborted the CSFB procedure. For the case where the WTRU may respond with an ESR (possibly with new type set to no response as proposed above) even without user intervention, the WTRU may not start any timer and may consider the procedure to be successfully completed and then enter EMM-REGISTERED.NORMAL state.

Alternatively, if the WTRU starts a timer when the CS Service Notification is received (as explained above) and the timer expires without any response from the user, the WTRU may ignore the CS Service Notification and therefore not send any ESR.

The described embodiments may be used in any combination and may apply to cases where user input is requested or not. Moreover, the described embodiments may be applied to idle mode if the WTRU is in idle mode, by first informing the user about the call before a decision is made to accept/reject the call. If no response is received, the discussed embodiments may be applied in that case as well.

Figure 10B:
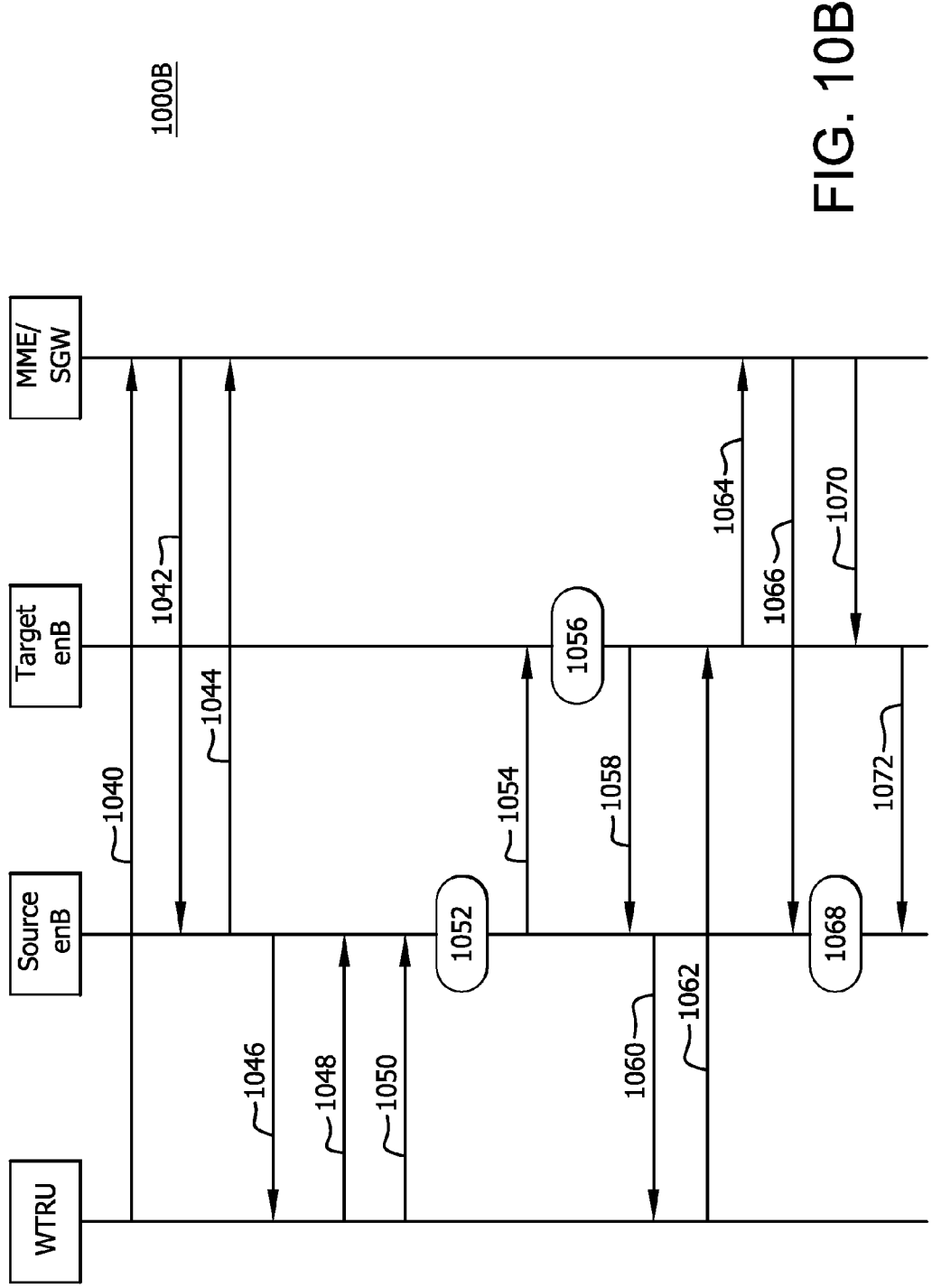

Another problem that may occur in wireless communications systems supporting CS and PS sessions, is that race conditions may exist between CSFB and intra-system HO. In the context of LTE systems, it is possible that there may be an occurrence of a CSFB and an intra-LTE HO event at around the same time causing potential conflicts to arise. There are several scenarios that may be possible for this to occur. FIGS. 10A and 10B are flow diagrams of examples of two possible scenarios, 1000A and 1000B, where race conditions may occur between CSFB and intra-LTE Handover. FIG. 10A shows the scenario where the eNB is unaware of an ongoing CSFB request, and FIG. 10B shows the scenario where the eNB is aware of an existing CSFB request.

FIG. 10A describes the case when the eNB is not aware of an ongoing CSFB request. As is shown in FIG. 10A, the WTRU sends an RRC message with a Measurement Report to the Source eNB, 1002. Based on the RRC message, the Source eNB makes a HO decision, 1004, and sends a (X2AP) HO Request to the Target eNB, 1006. After performing admission control, 1008, the Target eNB sends a (X2AP) HO ACK to the Source eNB, 1010. Before the WTRU receives an RRC HO Command from the Source eNB, 1014, to perform a HO to another eNB (intra-LTE handover), the WTRU sends an ESR message to the MME, 1012, in order to perform CSFB. This creates a race condition between the CSFB request and the intra-LTE handover.

The ESR triggers a WTRU Context Modification Request message, (with the CSFB indicator), 1016, from the MME to the source eNB, which in turn initiates a UE Context Modification Failure message from the Source eNB to the MME, 1018. At that point, the source eNB may not be able to initiate an inter-system change, (possibly with PS handover), as the WTRU is no longer under its control. Even though this problem is explained with the assumption of X2-based HO, it is possible that the problem occurs with the S1-based HO, or any other type of HO.

The Source eNB provides the Target eNB with information for the HO by sending a SN Status transfer message, 1020, and an UP data forwarding message, 1022, to the Target eNB. The WTRU sends an RRC HO Complete message to the Target eNB, 1024, once the HO is complete. The Target eNB sends a Path Switch Request to the MME, 1026, which informs the MME of the completion of the intra-HO, and the MME informs the Source eNB by sending an UP End Markers Packets messages, 1028. The Source eNB stops data forwarding to the WTRU, 1030. The MME responds to the Target eNB with a Path Switch Request ACK, 1032, and the Target eNB sends a Context release message, 1034, to the Source eNB.

FIG. 10B shows a similar problem occurring when the eNB is aware that there is an ongoing CSFB request for a given WTRU. The WTRU sends an ESR message to the MME, 1040, in order to perform CSFB. The ESR triggers a WTRU Context Modification Request message with the CSFB indicator, 1042, from the MME to the Source eNB, which in turn initiates a UE Context Modification Response message from the Source eNB to the MME, 1044. The Source eNB sends a configuration message, 1046, to the WTRU that configures the WTRU for inter-RAT measurements. The WTRU responds to the Source eNB with an RRC LTE Measurement Report, 1048, and an RRC I-RAT Measurement Report, 1050.

The Source eNB makes an Intra-LTE HO decision, 1052, and sends an (X2AP) HO Request, 1054, to the Target eNB. The Target eNB performs admission control, 1056, and responds to the Source eNB with a (X2AP) HO ACK, 1058. The Source eNB sends a HO Command to the WTRU, 1060, and the WTRU sends an RRC HO Complete message to the Target eNB, 1062. The Target eNB sends a Path Switch Request to the MME, 1064, which informs the MME of the completion of the intra-HO, and the MME informs the Source eNB by sending an UP End Markers Packets messages, 1066. The Source eNB stops data forwarding to the WTRU, 1068. The MME responds to the Target eNB with a Path Switch Request ACK, 1070, and the Target eNB sends a Context release message, 1072, to the Source eNB.

In the scenario shown in FIG. 10B, the Source eNB, even though it is aware that there is an ongoing CSFB request for the WTRU (because it has received the WTRU Context Modification Request with the CSFB indicator and has responded with a WTRU Context Modification Response), may decide to perform intra-LTE handover based on the measurement event and reports, 1048 and 1050, from the WTRU. If this did not happen, the Source eNB would have sent the Handover Required message to the MME in order to start the inter-system change to UTRAN.

In the scenario shown in FIG. 10B, the CSFB cannot be continued by the Source eNB, and the MME is not informed about it. The MME becomes informed about the completion of the intra-HO with the Path Switch Request message from the target eNB, 1064, which is transmitted to the MME from the Target eNB after the handover is complete.

The following embodiments address the problem of race conditions between CSFB and an intra-system HO. The embodiments apply to both X2-based HOs, S1-based HOs, or any other HO scenarios. Moreover, they also apply to the case when the source eNB is either aware or not aware of any ongoing request for CSFB.

In one embodiment, the source eNB may include an indication to the Target eNB about the CSFB request for a WTRU that is ongoing in the source cell. The effect of this is equivalent to the target eNB receiving the WTRU Context Modification request from the MME. The Target eNB may start the necessary CSFB-related procedure and solicit the WTRU for inter-RAT measurements, or send the Handover Required message to the MME. Referring back to FIG. 10A, the indication from the Source to the Target eNB may be included in the SN Status Transfer, 1020, and may be included in both S1AP or X2AP messages. The Source eNB may include any measurement report it might have collected from a WTRU in the messaging sent to the Target eNB, such as in the Handover Request message, 1006. The Target eNB may use these measurements without configuring the WTRU again for inter-RAT measurements.

In another embodiment, the MME may include the CSFB indicator in the Path Switch Request ACK that is sent from the MME to the Target eNB. For example, referring back to FIGS. 10A and 10B, the CSFB indicator may be included in the Path Switch Request ACK, 1032 and 1070, respectively. As such, the Target eNB may directly start any CSFB related procedures, such as configuring the WTRU for inter-RAT measurements or sending the Handover Required message to the MME.

According to another embodiment, the Source eNB may inform the MME when it decides to perform, or when it actually performs, intra-system (intra-LTE) handover, given there is signaling already started for a CSFB request after the Source eNB sends the WTRU a Context Modification Response message. The Source eNB may inform the MME, for example, using an S1-AP message such as the "Handover Required" message. As such, the MME may know ahead of time and may send the Context Modification Request message to the Target eNB. The MME may inform other nodes, such as the SGW or PDN GW, to buffer the packets until the intra-LTE or CSFB handover is completed.

The following embodiments describe MME-eNB interactions in order to realize CSFB.

In one embodiment, the MME may send a WTRU Context Modification request, (e.g. an S1AP message), or any other message with the purpose of providing information for performing CSFB for a specific WTRU. With this "CSFB information" message, the MME may inform the eNB communicating with the WTRU how the CSFB may be performed, which may be accomplished via PS HO, network assisted cell change order, cell change order, or via RRC connection release with redirection information. The MME may inform the eNB communicating with the WTRU whether at least one SIB of potential CS cells may be provided to the WTRU, and/or how the CSFB may be performed with the inclusion of new IEs in the message sent to the eNB.

Upon receiving the CSFB information message, the eNB may execute the CSFB according to the information from the MME. Thus, for CSFB for emergency calls, the MME may inform the eNB in the CSFB information message that the CSFB is of high priority, and perform the CSFB via one of the signaled methods. Referring back to FIGS. 10A and 10B, the CSFB information from the MME to the eNB may be included in the WTRU Context Modification Request message, 1016 and 1042, respectively, or in any other message from the MME to the eNB.

Alternatively, in another embodiment, if no new IE may be included in the WTRU Context Modification Request message, the high priority value of the CSFB indicator IE in the WTRU Context Modification Request message may be used as an indication to perform CSFB via RRC connection release, (or network assisted cell change, or cell change order), and may be used with System Information Blocks (SIBs) provision to the WTRU. Thus, when the CSFB indicator IE is set to "CSFB required" by the MME, the eNB may perform CSFB with PS HO. Otherwise, a value of 'CSFB high priority' may cause the eNB to perform CSFB via RRC connection release, (or network assisted cell change, or cell change order), and may be used with SIBs provision to the WTRU.

If the MME receives a request from the WTRU or the MSC/VLR to cancel an ongoing CSFB procedure, there may be options by the MME to abort the CSFB procedure. If the MME received a handover request message from the eNB, (which started a guard timer for this message), the MME may not send a response message (i.e. HO command) to the eNB. Thus, the timer at the eNB may ultimately expire and thereby the eNB may not autonomously decide to continue with the CSFB procedure.

Alternatively, the MME may send an explicit message to the eNB to inform it to abort the CSFB procedure. This may be done with an existing message such as WTRU Context Modification Request (1016 and 1042 in FIGS. 10A, and 10B respectively). In any of these cases, the MME may include a new IE to indicate the cause of the request to cancel the CSFB procedure. Thus, the eNB when it receives this message may abort the CSFB procedure. The eNB may be configured to perform CSFB in a certain way regardless of the type ESR. This configuration may be done for a specific time period or via explicit signaling by the MME.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for synchronizing bearer contexts between a transmitter entity and a receiver entity, the method comprising:
   detecting, at the transmitter entity, an update in a status of a bearer context; and
   transmitting a bearer context status information element (IE) in a non-access stratum (NAS) message from the transmitter entity to the receiver entity, wherein the bearer context status IE is based on the update in the status of the bearer context, and wherein the NAS message is a next message sent from the transmitter entity to the receiver entity based on the update in the status of the bearer context being detected.

2. The method of claim 1 wherein the bearer context is an evolved packet system (EPS) bearer context.

3. The method of claim 1 wherein the status of the bearer context indicates if the bearer context is active or inactive.

4. The method of claim 1 wherein the transmitter entity is a wireless transmit/receive unit (WTRU) and the receiver entity is a mobility management entity (MME).

5. The method of claim 1 wherein the transmitter entity is a mobility management entity (MME) and the receiver entity is a wireless transmit/receive unit (WTRU).

6. The method of claim 1 wherein the NAS message comprise an extended service request (ESR) message.

7. A transmitter entity for synchronizing bearer contexts with a receiver entity, the transmitter entity configured at least in part to:
   detect an update in a status of a bearer context; and
   provide a bearer context status information element (IE) in a non-access stratum (NAS) message to the receiver entity, wherein the bearer context status IE is based on the update in the status of the bearer context, and wherein the NAS message is a next message sent from the transmitter entity to the receiver entity based on the update in the status of the bearer context being detected.

8. The transmitter entity of claim 7 wherein the bearer context is an evolved packet system (EPS) bearer context.

9. The transmitter entity of claim 7 wherein the status of the bearer context indicates if the bearer context is active or inactive.

10. The transmitter entity of claim 7 wherein the transmitter entity is configured as a wireless transmit/receive unit (WTRU) and wherein the receiver entity is configured as a mobility management entity (MME).

11. The transmitter entity of claim 7 wherein the transmitter entity is configured as a mobility management entity (MME) and wherein the receiver entity is configured as a wireless transmit/receive unit (WTRU).

12. The transmitter entity of claim 7 wherein the NAS message comprise an extended service request (ESR) message.

* * * * *